United States Patent
Eroz et al.

(10) Patent No.: US 10,630,512 B2
(45) Date of Patent: *Apr. 21, 2020

(54) OPTIMAL FORWARD ERROR CORRECTION FOR NON-ORTHOGONAL MULTIPLE ACCESS (NOMA) COMMUNICATIONS SYSTEMS

(71) Applicant: Hughes Network Systems, LLC, Germantown, MD (US)

(72) Inventors: Mustafa Eroz, Germantown, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,922

(22) Filed: Mar. 11, 2019

(65) Prior Publication Data
US 2019/0288884 A1 Sep. 19, 2019

Related U.S. Application Data

(63) Continuation-in-part of application No. 15/254,814, filed on Sep. 1, 2016, now Pat. No. 10,263,814, which
(Continued)

(51) Int. Cl.
*H04L 25/03* (2006.01)
*H04L 1/00* (2006.01)
(Continued)

(52) U.S. Cl.
CPC ...... *H04L 25/03866* (2013.01); *H04J 11/003* (2013.01); *H04J 11/0046* (2013.01);
(Continued)

(58) Field of Classification Search
CPC ............ H04L 25/03866; H04L 1/0058; H04L 1/0066; H04L 1/009; H04L 1/0048;
(Continued)

(56) References Cited

U.S. PATENT DOCUMENTS

| 6,023,783 | A * | 2/2000 | Divsalar | ............. | H03M 13/256 |
| | | | | | 714/792 |
| 6,430,722 | B1 * | 8/2002 | Eroz | ................... | H03M 13/036 |
| | | | | | 714/755 |

(Continued)

OTHER PUBLICATIONS

Benedetto, et al., "Design of Parallel Concatenated Convolutional Codes", IEEE Transactions on Communications, vol. 44, No. 5, May 1996.

*Primary Examiner* — J. Brant Murphy
(74) *Attorney, Agent, or Firm* — Potomac Technology Law, LLC

(57) ABSTRACT

A multiple access scheme is provided. A first communications terminal encodes a first data stream using a forward error correction (FEC) code, and scrambles the encoded first data stream based on a first scrambling signature. A second communications terminal encodes a second data stream using the FEC code, and scrambles the encoded second data stream based on a second scrambling signature. The first scrambling signature and the second scrambling signature are used, respectively, by the first terminal and the second terminal to distinguish the first encoded data stream from the second encoded data stream as respectively originating from the first terminal and the second terminal in a multiple access scheme, whereby the first encoded data stream and the second encoded data stream simultaneously share a wireless communications channel. The FEC code is a low density parity check (LDPC) code configured with a data node degree of two or three.

11 Claims, 29 Drawing Sheets

Related U.S. Application Data is a continuation of application No. 13/742,635, filed on Jan. 16, 2013, now Pat. No. 9,461,765, which is a continuation of application No. 12/056,144, filed on Mar. 26, 2008, now abandoned.

(60) Provisional application No. 62/641,154, filed on Mar. 9, 2018, provisional application No. 60/908,340, filed on Mar. 27, 2007.

(51) Int. Cl.
*H04J 11/00* (2006.01)
*H04L 7/04* (2006.01)

(52) U.S. Cl.
CPC ............ *H04L 1/009* (2013.01); *H04L 1/0041* (2013.01); *H04L 1/0048* (2013.01); *H04L 1/0057* (2013.01); *H04L 1/0058* (2013.01); *H04L 1/0066* (2013.01); *H04L 7/048* (2013.01)

(58) Field of Classification Search
CPC ..... H04L 7/048; H04L 1/0057; H04L 1/0041; H04J 11/003; H04J 11/0046
See application file for complete search history.

(56) References Cited

U.S. PATENT DOCUMENTS

| | | | |
|---|---|---|---|
| 6,529,495 B1 * | 3/2003 | Aazhang | H04B 1/71075 370/342 |
| 6,724,813 B1 * | 4/2004 | Jamal | H04W 72/02 375/219 |
| 6,940,827 B2 * | 9/2005 | Li | H04B 1/707 370/278 |
| 7,447,984 B2 * | 11/2008 | Cameron | H03M 13/253 714/746 |
| 7,746,758 B2 | 6/2010 | Stolpman | |
| 8,126,076 B2 * | 2/2012 | Sartori | H04L 1/06 375/130 |
| 2003/0037298 A1 * | 2/2003 | Eleftheriou | G11B 20/1833 714/752 |
| 2003/0039301 A1 * | 2/2003 | Bradley | H04L 1/707 375/147 |
| 2003/0204808 A1 * | 10/2003 | Mills | H04B 1/7105 714/786 |
| 2003/0226089 A1 * | 12/2003 | Rasmussen | H04L 1/004 714/758 |
| 2004/0054960 A1 * | 3/2004 | Eroz | H03M 13/11 714/800 |
| 2004/0258177 A1 * | 12/2004 | Shen | H03M 13/1117 375/308 |
| 2006/0045062 A1 * | 3/2006 | Gorokhov | H04L 1/0041 370/343 |
| 2006/0224935 A1 * | 10/2006 | Cameron | H03M 13/253 714/752 |
| 2007/0223367 A1 * | 9/2007 | Wu | H04L 1/0001 370/216 |
| 2008/0019263 A1 * | 1/2008 | Stolpman | H04L 1/0041 370/210 |
| 2009/0187804 A1 * | 7/2009 | Shen | H03M 13/1148 714/752 |
| 2010/0091902 A1 * | 4/2010 | Park | H04L 1/1893 375/295 |
| 2010/0100789 A1 * | 4/2010 | Yu | H03M 13/114 714/752 |
| 2011/0051825 A1 * | 3/2011 | Tao | H04L 1/0057 375/260 |
| 2015/0236884 A1 * | 8/2015 | Suh | H04L 27/2627 375/295 |

* cited by examiner $$D = \begin{bmatrix} 0 & 1 & 0 & & O \\ & 1 & 0 & \ddots & \\ & & & \ddots & 1 & 0 \\ O & & & & & 1 & 0 \end{bmatrix}_{M \times M}$$

FIG. 5B $$H_b = \underbrace{\begin{bmatrix} O & O & \cdots & \cdots & \cdots & \cdots & D \\ O & O & \cdots & \cdots & \cdots & \cdots & \vdots \\ \vdots & O & O & \cdots & \cdots & \cdots & \vdots \\ \vdots & \vdots & \vdots & \vdots & \vdots & \vdots & \vdots \\ O & \cdots & \cdots & \cdots & \cdots & \cdots & O \end{bmatrix}}_{\text{systematic part} \quad \text{parity part}}$$

FIG. 5A

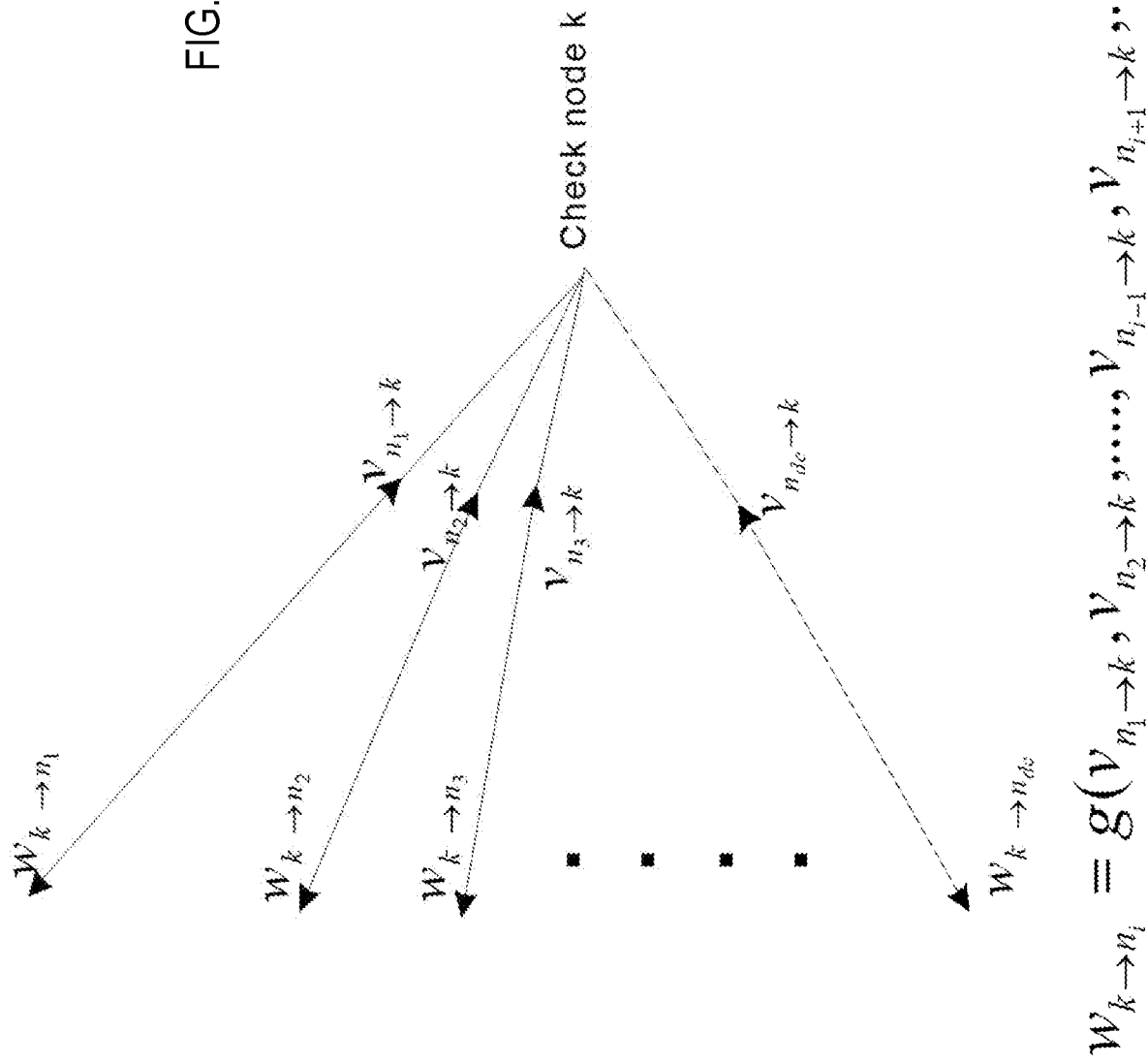

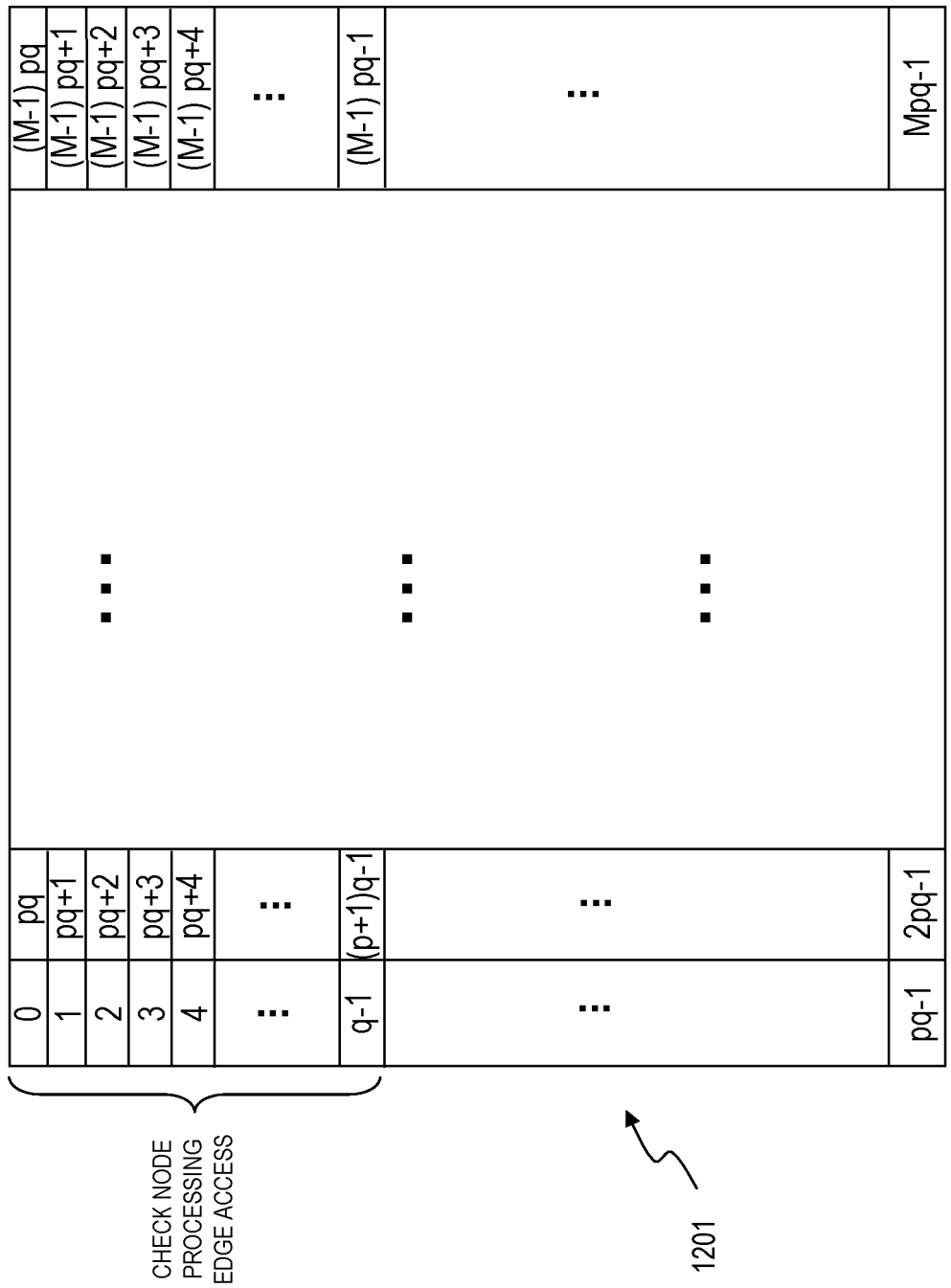

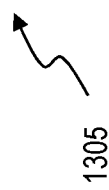
FIG. 13C
FIG. 13A
FIG. 13D

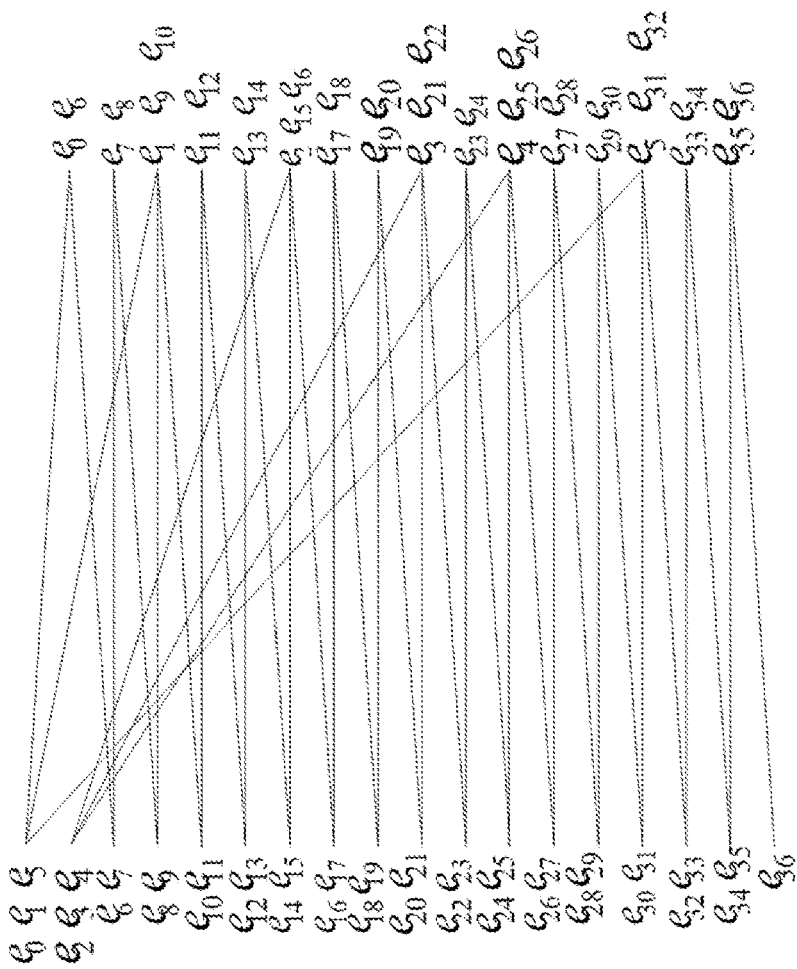

OPTIMAL FORWARD ERROR CORRECTION FOR NON-ORTHOGONAL MULTIPLE ACCESS (NOMA) COMMUNICATIONS SYSTEMS

This application claims priority under 35 U.S.C. § 119 based on U.S. Provisional Application Ser. No. 62/641,154 (filed 2018 Mar. 9), the entirety of which are incorporated herein by reference, and this application is a continuation-in-part, and claims the benefit of the filing date under 35 U.S.C. § 120, from U.S. patent application Ser. No. 15/254,814 (filed 2016 Sep. 1), which is a continuation, and claims the benefit of the filing date under 35 U.S.C. § 120, from U.S. patent application Ser. No. 13/742,635 (filed 2013 Jan. 16), now U.S. Pat. No. 9,461,765, which is a continuation, and claims the benefit of the filing date under 35 U.S.C. § 120, from U.S. patent application Ser. No. 12/056,144 (filed 2008 Mar. 26), now abandoned, which claims the benefit of the filing date under 35 U.S.C. § 119(e) from U.S. Provisional Patent Application Ser. No. 60/908,340 (filed 2007 Mar. 27), the entireties of which are incorporated herein by reference.

FIELD OF THE INVENTION

The present invention relates to wireless communications systems, and more particularly to wireless communications systems employing a non-orthogonal multiple access (NOMA) scheme and a forward error correction (FEC) scheme, such as Low Density Parity Check (LDPC) coding.

BACKGROUND

Multiple access schemes are employed by modern wireless communications systems to allow multiple users to share a common limited spectrum or bandwidth resources, while maintaining acceptable system performance. Common multiple access schemes include Frequency Division Multiple Access (FDMA), Time Division Multiple Access (TDMA) and Code Division Multiple Access (CDMA). Traditionally this resource sharing has been achieved in an orthogonal way, meaning that the users do not interfere with each other as they transmit their signals. The two most common orthogonal multiple access techniques are time TDMA where the users take turn in using the whole spectrum (via time slots), and FDMA where the users divide the spectrum among themselves and transmit continuously. Most often, a combination of the two methods is used. Non-orthogonal multiple access (NOMA), on the other hand, allows users to interfere with each other, and sorts them out at the receiver. Various receiver algorithms exist with varying complexity/performance trade-offs.

System performance is also aided by error control codes or forward error correction (FEC) encoding. Nearly every communications system relies on some form of error control for managing errors that may occur due to noise and other factors during transmission of information through a communications channel. These communications systems can include satellite systems, fiber-optic systems, cellular systems, and radio and television broadcasting systems. Efficient error control schemes implemented at the transmitting end of these communications systems have the capacity to enable the transmission of data (including audio, video, text, etc.) with very low error rates within a given signal-to-noise ratio (SNR) environment. Powerful error control schemes also enable a communications system to achieve target error performance rates in environments with very low SNR, such as in satellite and other wireless systems where noise is prevalent and high levels of transmission power are costly, if even feasible. A broad class of powerful error control schemes that enable reliable transmission of information have emerged, including low density parity check (LDPC) codes and turbo codes. Both LDPC codes as well as some classes of turbo codes have been successfully demonstrated to approach near the theoretical bound (i.e., Shannon limit). Although long constraint length convolutional codes can also approach the Shannon limit, decoder design complexity prevents practical, wide spread adoption. LDPC codes and turbo codes, on the other hand, can achieve low error rates with lower complexity decoders. Consequently, these codes have garnered significant attention.

For example, conventional data transmission to and from an ultra-small terminal via satellite is usually based on Code Division Multiple Access (CDMA) technique, for example using FEC encoding at high code rates such as 1/2 or 1/3 (e.g., turbo codes or LDPC codes). CDMA spreads bandwidth to reduce the interference between adjacent satellites, whereas the error coding provides coding gain needed to close the link. CDMA also allows multiple users sharing common bandwidth at the same time. CDMA systems, however, typically need a large bandwidth expansion factor to function properly. Additionally, CDMA systems require all signals accessing the same spectrum at the same time to be of equal power, and provision for power control makes CDMA system more complicated to implement. Traditionally, multiple-user access systems (e.g., NOMA systems) employ error coding that provides the best performance for a single-user system access system (where the same bandwidth resources are not shared by multiple users). Moreover, based on different requirements and regulations (e.g., set by Federal Communications Commission (FCC), International Radio Union, etc.), limit various radio transmission attributes of terminals, such as antenna side lobe, power density at antenna flange, off-axis effective isotropic radiate power (EIRP) density, etc., for example, radiated by terminals that communicate via satellite. Accordingly, in order to provide uplink closure at high data rates using small aperture antenna (for example, in small terminals), such regulatory limits can easily be exceeded by conventional radio transmission means.

Accordingly, there is a need for a multiple access scheme (e.g., a NOMA scheme) combined with a forward error correction (FEC) encoding scheme that can effectively utilize a broad range of code rates for different terminal types in differing channel environments.

Some Example Embodiments

The present invention advantageously addresses the foregoing requirements and needs, as well as others, by providing a scrambled coded multiple access (SCMA) scheme, combined with a forward error correction (FEC) encoding scheme, that effectively utilizes a broad range of code rates for different terminal types in differing channel environments.

In accordance with example embodiments of the present invention, a method is provided for data communications via a multiple access scheme. A first data stream is encoded by an encoder of a first data communications terminal using a forward error correction (FEC) code to generate a first encoded data stream. The first encoded data stream is scrambled by a scrambler of the first data communications terminal based on a first scrambling signature. The scrambled first encoded data stream is modulated by a modulator of the first data communications terminal to generate a first modulated data signal for transmission over a wireless data communications channel. A second data stream is encoded by an encoder of a second data communications terminal using the FEC code to generate a second encoded data stream. The second encoded data stream is scrambled by a scrambler of the second data communications terminal based on a second scrambling signature. The scrambled second encoded data stream is modulated by a modulator of the second data communications terminal to generate a second modulated data signal for transmission over the wireless data communications channel. The first scrambling signature and the second scrambling signature are assigned, respectively, to the first data communications terminal and the second data communications terminal to distinguish the first encoded data stream from the second encoded data stream as respectively originating from the first data communications terminal and the second data communications terminal in a multiple access scheme, where the first encoded data stream and the second encoded data stream are configured to simultaneously share the wireless data communications channel. The FEC code is a low density parity check (LDPC) code configured with a bit node degree of two or three. By way of example, the FEC code is of a rate of 1/14, 1/12, 1/10, 1/8, 1/6, 1/4, 1/3 or 1/2.

According to a further example embodiment of the method, a spectral spreading is applied by the first data communications terminal to the first modulated data signal, and the spectral spreading is applied by the second data communications terminal to the second modulated data signal.

According to a further example embodiment of the method, a receiving data communications terminal receives a transmission signal via which the first and second modulated data signals were transmitted over the wireless data communications channel, and the transmission signal is decoded by the receiving data communications terminal to reproduce the first and second bit streams.

In accordance with further example embodiments of the present invention, a data communications terminal is provided. The data communications terminal comprises an encoder configured to encode a bit stream of the data communications terminal using a forward error correction (FEC) code to generate an encoded data stream, a scrambler configured to scramble the encoded data stream based on a scrambling signature, and a modulator configured to modulate the scrambled encoded data stream to generate a modulated data signal for transmission over a wireless data communications channel. The scrambling signature is configured to distinguish the encoded data stream from a further encoded data stream of a further data communications terminal, and to distinguish the encoded data stream as originating from the data communications terminal in a multiple access scheme, where the encoded data stream is configured to simultaneously share the wireless data communications channel with the further encoded data stream. The FEC code is a low density parity check (LDPC) code configured with a bit node degree of two or three. By way of example, The FEC code is of a rate of 1/14, 1/12, 1/10, 1/8, 1/6, 1/4, 1/3 or 1/2.

According to a further example embodiment of the data communications terminal, the terminal further comprises a signal spreader configured to apply a spectral spreading to the first modulated data signal.

In accordance with further example embodiments of the present invention, a data communications system is provided. The data communications system comprises a first data communications terminal comprising an encoder configured to encode a first bit stream of the first data communications terminal using a forward error correction (FEC) code to generate a first encoded data stream, a scrambler configured to scramble the first encoded data stream based on a first scrambling signature, and a modulator configured to modulate the scrambled first encoded data stream to generate a first modulated data signal for transmission over a wireless data communications channel. The data communications system further comprises a second data communications terminal comprising an encoder configured to encode a second bit stream of the second data communications terminal using the FEC code to generate a second encoded data stream, a scrambler configured to scramble the second encoded data stream based on a second scrambling signature, and a modulator configured to modulate the scrambled second encoded data stream to generate a second modulated data signal for transmission over the wireless data communications channel. The first scrambling signature and the second scrambling signature are assigned, respectively, to the first data communications terminal and the second data communications terminal to distinguish the first encoded data stream from the second encoded data stream as respectively originating from the first data communications terminal and the second data communications terminal in a multiple access scheme, where the first encoded data stream and the second encoded data stream are configured to simultaneously share the wireless data communications channel. The FEC code is a low density parity check (LDPC) code configured with a bit node degree of two or three. By way of example, The FEC code is of a rate of 1/14, 1/12, 1/10, 1/8, 1/6, 1/4, 1/3 or 1/2.

According to a further example embodiment of the data communications system, the first data communications terminal further comprises a signal spreader configured to apply a spectral spreading to the first modulated data signal, and the second data communications terminal further comprises a signal spreader configured to apply the spectral spreading to the second modulated data signal.

According to a further example embodiment of the data communications system, the system, further comprises a third data communications terminal comprising a receiver configured to receive a transmission signal via which the first and second modulated data signals were transmitted over the wireless data communications channel, and a decoder configured to decode the transmission signal to reproduce the first and second bit streams.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings, and in which like reference numerals refer to similar elements and in which:

FIG. 5A shows a check matrix of an example class of LDPC codes;

FIG. 5B shows an M×M special matrix that is denoted by the entry "D" in the matrix of FIG. 5A;

FIGS. 11A-11C are diagrams of interactions between the check nodes and the bit nodes in the LDPC decoding process;

FIGS. 12A and 12B are diagrams of the top edge and bottom edge, respectively, of memory organized to support structured access as to realize randomness in LDPC coding;

FIGS. 13A-13D are diagrams of an example parity check matrix, bipartite graph, top edge RAM and bottom edge RAM, respectively, to support structured access as to realize randomness in LDPC coding;

FIGS. 14A-14D are diagrams of a further example parity check matrix, bipartite graph, top edge RAM and bottom edge RAM, respectively, to support structured access as to realize randomness in LDPC coding.

DETAILED DESCRIPTION

Figure 1:
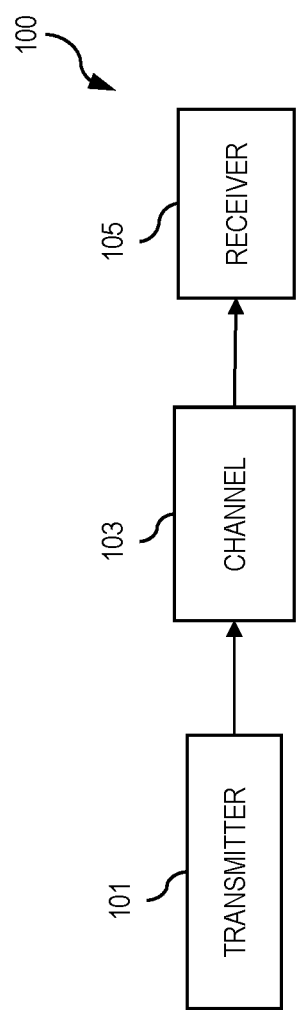
FIG. 1 illustrates a high-level block diagram of a communications system for providing a scrambled coded multiple access (SCMA) scheme of example embodiments.

The following example embodiments of the present invention provide a scrambled coded multiple access (SCMA) scheme, combined with a forward error correction (FEC) encoding scheme, that effectively utilizes a broad range of code rates, while minimizing complexity. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Further, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

FIG. 1 illustrates a high-level block diagram of a communications system for providing a scrambled coded multiple access (SCMA) scheme of example embodiments. A data communications system 100 includes one or more transmitters 101 (of which one is shown) that generate signal waveforms and transmit the signal waveforms across a communications channel 103 to one or more receivers 105 (of which one is shown). In this discrete communications system 100, the transmitter 101 has a message source that produces a discrete set of possible messages, each of which having a corresponding signal waveform. The signal waveforms are attenuated, or otherwise altered, by the communications channel 103. To combat the noise induced by the channel 103, coding is utilized, such as forward error correction (FEC) coding (e.g., turbo codes or low density parity check (LDPC) codes may be employed).

Forward error correction (FEC) is required in terrestrial and satellite systems to provide high quality communications over a radio frequency (RF) propagation channel, which induces signal waveform and spectrum distortions, including signal attenuation (freespace propagation loss) and multi-path induced fading. These impairments drive the design of the radio transmission and receiver equipment, including such example design objectives as selection of modulation formats, error control schemes, demodulation and decoding techniques, and selection of hardware components that together provide an efficient balance between system performance and implementation complexity. Differences in propagation channel characteristics, such as between terrestrial and satellite communications channels, naturally result in significantly different system designs. Likewise, existing communications systems continue to evolve in order to satisfy increased system requirements for new higher rate or higher fidelity communications services.

Code rate is an important factor that has a significant effect on the error performance of the code. The choice of which code rate to operate, in turn, depends on the signal to noise ratio (SNR) of the environment in which the codes will be deployed. Traditionally, low SNR environments require the use of low rate codes (i.e., more redundancy), whereas high SNR environments can enable the utilization of higher code rates. In any case, to maximize throughput and thereby efficiently utilize the available spectrum or bandwidth, there is a continual challenge to devise codes that edge closer to the Shannon limit, while minimizing complexity.

According to example embodiments, structured LDPC codes can be employed by the transmitter to enable high speed implementation without incurring any performance loss. Structured LDPC codes, for example avoid assignment of a small number of check nodes to the bit nodes already vulnerable to channel errors by virtue of the modulation scheme. Further, such LDPC codes have a parallelizable decoding algorithm (unlike turbo codes), which advantageously involves simple operations such as addition, comparison, and table look-up. Moreover, carefully designed LDPC codes do not exhibit any sign of an error floor. According to one such example embodiment, the transmitter may employ a relatively simple encoding technique using LDPC codes based on parity check matrices (which facilitate efficient memory access during decoding) to communicate with the receiver. The transmitter employs LDPC codes that can outperform concatenated turbo+RS (Reed-Solomon) codes, provided the block length is sufficiently large.

Figure 2A:
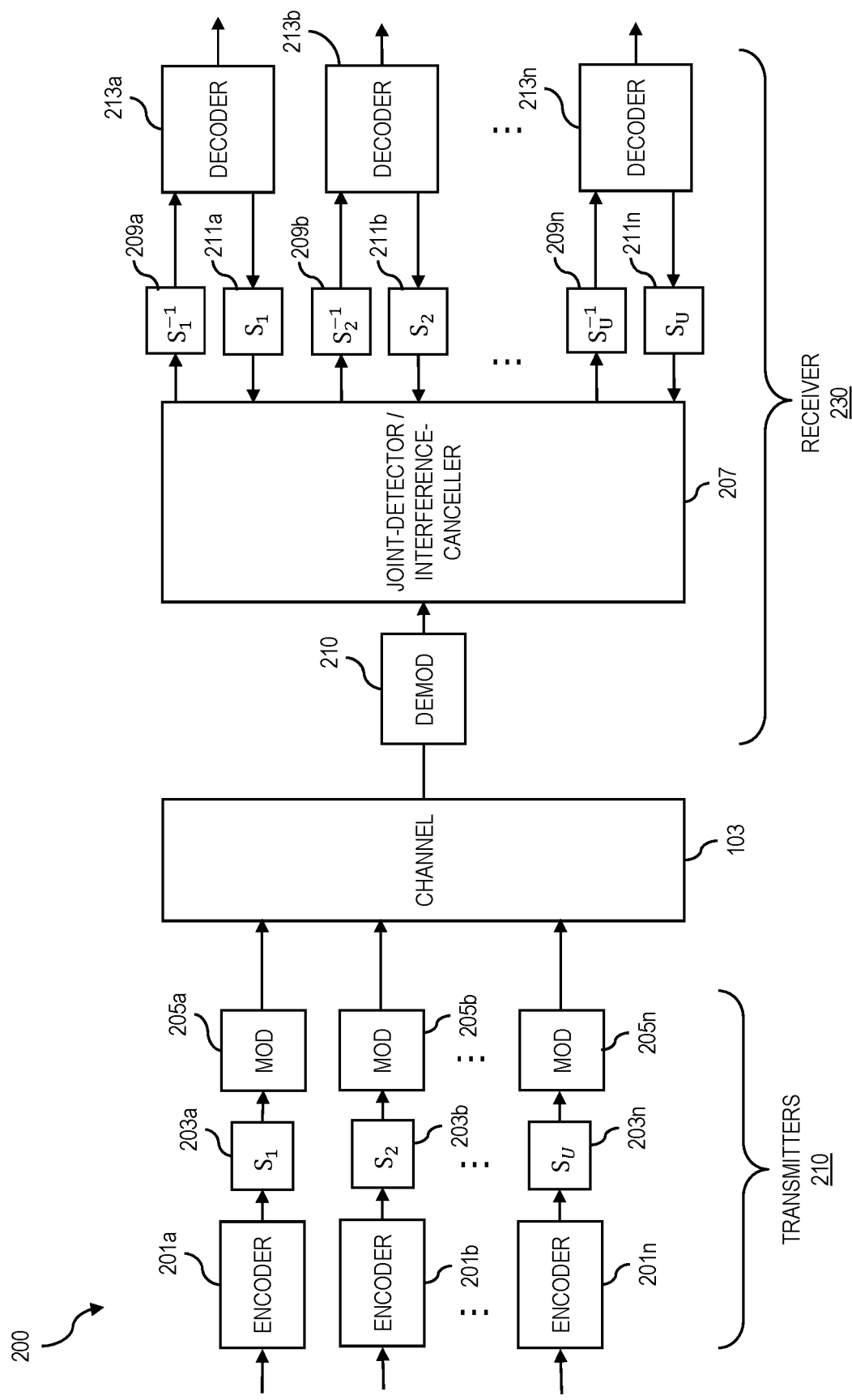
FIG. 2A illustrates a multi-user system which supports multiple transmitters using an SCMA scheme according to example embodiments.
Figure 2B:
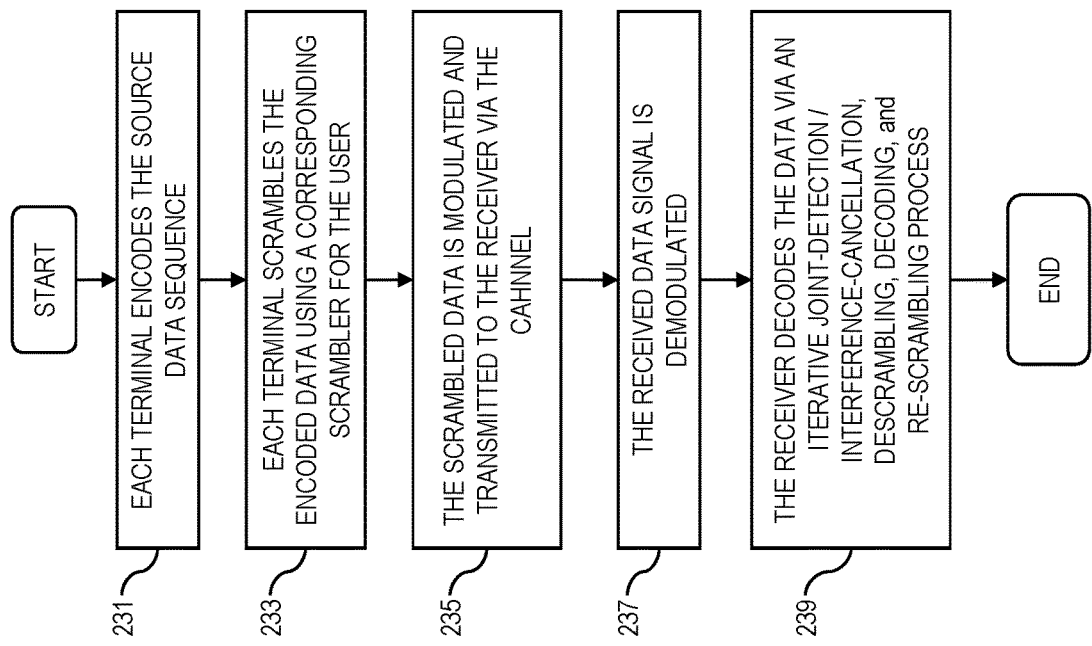
FIG. 2B illustrates a flowchart of an associated scrambling process employed for the SCMA scheme of FIG. 2A according to example embodiments.

FIG. 2A illustrates a multi-user system which supports multiple transmitters using an SCMA scheme, and FIG. 2B illustrates a flowchart of an associated scrambling process employed for the SCMA scheme of FIG. 2A, according to example embodiments. A group of U users access a common channel by transmitting on the same frequency bandwidth and at the same time. Without any loss of generality, assume each user encodes its own data using a low density parity check (LDPC) encoder. Let $u_k=(u_{k1}, u_{k2}, \ldots u_{kK})$, where k=1, 2, ..., U denotes K information bits of the $k^{th}$ user, and the corresponding codeword $c_k=(c_{k1}, c_{k2}, \ldots c_{kN})$, where R=K/N is the code rate. Before modulation, each codeword is scrambled with a user specific scrambler $s_k=(s_{k1}, s_{k2}, \ldots, s_{kN})$, for example, where the resulting scrambled sequence may be determined as $d_k=(d_{k1}, d_{k2}, \ldots, d_{kN})$, where $d_{ki}=c_{ki} \oplus s_{ki}$ ("$\oplus$" denotes modulo-2 addition). At the receiver, an iterative soft-in/soft-out multiuser detection and LDPC decoding is performed.

By Way of example, a multiple-access communications system 200 supports multiple terminals 210 (e.g., user terminals) configured with respective encoders 201a-201n, scramblers 203a-203n and modulators 205a-205n. By way of further example, on the receive side of the channel 103, the multiple-access communications system 200 includes one or more receivers 230 (of which only one is shown) configured with a demodulator 210, joint-detector/interference-canceller 207, descramblers 209a-209n and scramblers 211a-211n, and decoders 213a-213n. According to such example embodiments, the system 200 provides a multiple access scheme, such as SCMA, which achieves good performance with relatively lower receiver complexity compared to CDMA (e.g., as the number of users that share the same channel increases). With SCMA, each user sharing the transmission channel is separated by user specific scramblers 203a-203n. Also, due to lack of spreading factor and more efficient FEC coding, a fraction of a satellite transponder is needed under the SCMA scheme, thereby lowering the operating cost.

According to one such embodiment, each of the encoders 201a-201n utilizes the same FEC codes (e.g., LDPC code or turbo code) to encode the respective source data sequence (e.g., originating from an application layer of the terminal or of a user/client device) (Step 231). The encoded sequences are fed to the respective user-specific scramblers 403a-403n. Each scrambler scrambles the encoded sequence fed to it based on a scrambling signature that is specific to the respective terminal (e.g., user terminal) (Step 233), which will be determined by the receiver in order to attribute each received sequence to the respective terminal from which the sequence originated. Alternatively, each terminal may utilize the same scrambler hardware (e.g., a common interleaver design) with a different respective terminal-specific initial vector (also known as "seed"), instead of a different terminal-scrambler design (e.g., interleaver design) being implemented in each respective terminal. Further, using scrambling sequences as signatures is simpler than random interleaver-based signatures. The scrambled sequences are then modulated via the respective modulators 205a-205n and transmitted over channel 103 to the receiver 230 (Step 235). The receiver first demodulates the received data signal via the demodulator 210 to generate the individual received data signals (Step 237). The receiver then decodes the received sequences via an iterative process, whereby, via each iteration, the receiver determines a better estimate of the original data sequence, until a reliable estimate is reached (Step 239). The information exchanged between decoders 213a-213n and joint-detector/interference-canceller 207 is descrambled/scrambled via the descramblers 209a-209n and scramblers 211a-211n, respectively. Once good estimates of the decoded sequences are produced, they are output from the decoders 213a-213n.

By way of example, with regard to the scramblers 203a-203n, a scrambler receives a codeword (e.g., "0 0 1 0 1 0") and a scrambling sequence (e.g., "1 0 1 0 1 1"). The scrambling sequence (or signature) can be a Gold sequence or any pseudorandom number sequence. Gold codes exhibit a number of characteristics. In addition to being simple to generate, these sequences contain roughly an equal number of zeros and ones, and are approximately orthogonal when delayed or shifted. Also, they are orthogonal to other codes. Gold sequences can be generated using feedback shift registers, whose outputs are added to produce the Gold codes. The codeword and scrambling sequence are then combined to output a transmitted sequence (e.g., "1 0 0 0 0 1").

As mentioned, use of scramblers (as opposed to interleavers) reduces complexity. In a large system with numerous users, it is difficult to deploy a large number of interleavers that are prearranged between each pair of sender and receiver, whereas a common scrambler with different initial vector (also known as "seed") can be used for each pair of sender and receiver. Such arrangement is substantially easier to implement.

Unlike conventional CDMA systems, the joint-detection/interference-canceller 207 does not require all the signals accessing the same spectrum at the same time to be of equal power. Further, the performance is better when the signals are of different power level. Thus, no tight power controls are needed. Also due to joint-detection/interference-cancellation, the system provides a scheme that is much more robust against Rician fading, which makes it particularly more attractive for small mobile terminals experiencing Rician multipath fading.

According to further example embodiments, as an SCMA system, the system may utilize low-rate FEC coding, which requires less power to transmit data at the same speed vis-à-vis a CDMA system. In one embodiment, the system can be operated in a random access manner and does not require reservation of time slots, which minimizes the delay to one satellite round trip. Additionally, based on the lack of a requirement for tight power control, coordination needed between each transmitter and the receiver is minimized. By way of example, potential applications may include mobile or aeronautical terminals, or a direct broadcast satellite (DBS) operator may accordingly be able to provide return link over satellite via a commercial satellite using existing antenna systems.

Each user encodes its data with, for example, a rate 1/n FEC code, and the coded bits are then scrambled with a unique scrambling sequence. The number of unique scrambling sequences are virtually unlimited with common sequence generators, such as the Gold sequences. The same generator can generate all the sequences, which are differentiated by the initial vector. In an example embodiment, the scrambling sequence can be generated by selecting a pseudorandom number sequence (e.g., Gold sequence) whose period is greater than the code block. On the receiver side, the respective receiver uses a corresponding de-scrambler/scrambler and a rate 1/n decoder for each respective data sequence being received, to retrieve the respective original source data sequence.

Figure 3:
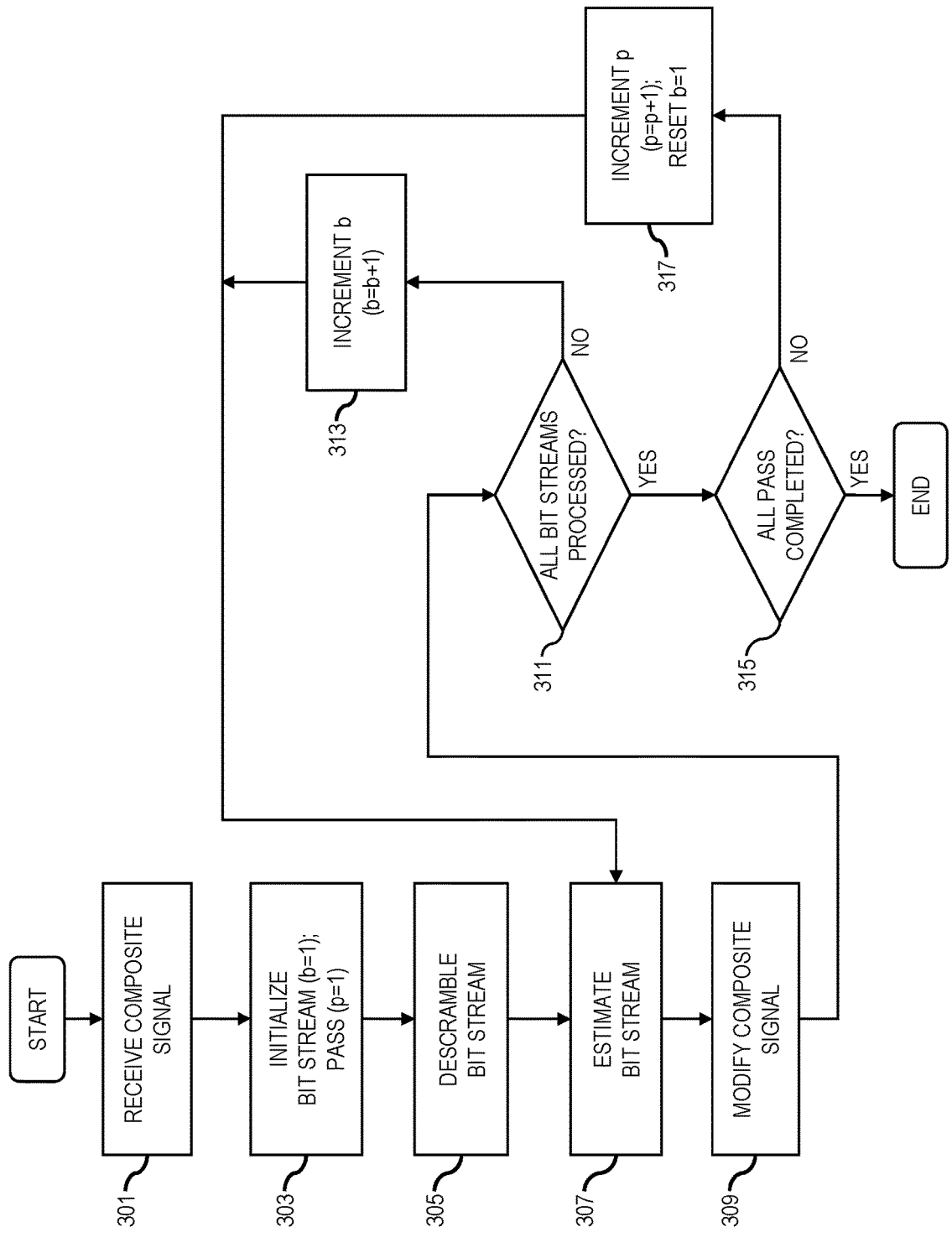
FIG. 3 is a flowchart of an example process for joint-detection/interference-cancellation as may be performed by the receiver of FIG. 2A according to example embodiments.

FIG. 3 is a flowchart of an example process for joint-detection/interference-cancellation as may be performed by the receiver of FIG. 2A according to an example embodiment. One enabler for this communications system 200 is the joint-detection/interference cancellation receiver, which (as described above) includes the descramblers/scramblers 209a-209n/211a-211n and the decoders 213a-213n, in addition to signal estimators and interference reducers (within the Joint-Detector/Interference-Canceller 207) for each of the individual signal paths. In addition, the receiver includes a buffer (not shown) to store a complete block of the composite signal. The receiver employs joint-detection/estimation, where it is contemplated that any joint-detection/estimation technique may be used. In an example embodiment, the receiver operates iteratively to output the bit streams represented by the composite signal.

With reference to FIG. 3, in steps 301-307, once an entire block of composite waveform is sampled and stored in the buffer, the receiver first uses the first descrambler (e.g., descrambler 209a) and a decoder (e.g., decoder 213a) to estimate the first bit-stream, whereby, in step 309, the composite signal is modified accordingly. In this example, only one pass of the decoding is performed. The interference reducer then operates on the stored waveform given the result of the first pass decoding of the first signal. The receiver then uses the second descrambler (e.g., descrambler 209b) and decoder (e.g., decoder 213b) to estimate the second bit-stream, and so on. When all the bit-streams have been estimated once (as determined in step 311), the receiver then returns to process the first bit-stream in a second pass. When all the bit-streams have been processed for the required number passes (steps 313-317), all the bit-streams are completely estimated and decoded. Alternatively, in another embodiment, all the paths can be processed in-parallel for each pass; this approach may entail more passes than the above process.

Signal estimation, via a demodulator (not shown), plays an important role. In most applications of interest, this demodulator must operate at very low signal-to-noise plus interference ratio. In one embodiment, the demodulator is aided by two features: synchronization, and joint detection. The initial synchronization involves use of a known pilot, which can be introduced using anyone of the techniques known in the art. For example, known pilot symbols can be introduced by multiplexing them into the data stream, or pilot symbols may be introduced by puncturing the encoder output. Just as each encoder 201a-201n employs a different scrambling signature, each may employ a different pilot symbol pattern, thereby minimizing interference effects.

In one embodiment, the signals are transmitted in a burst mode. Accordingly, the demodulator is configured to detect the burst arrival times by using, for example, a "Unique Word" pattern. It is recognized that any other well-known techniques may be used for this purpose. The Unique Word patterns of the various encoders may or may not be distinct.

With respect to joint detection, this process involves iterative refinement of the demodulation. As the iteration progresses, the demodulation is improved through two techniques. First, as interference is removed, the estimation of signal parameters (e.g., frequency, symbol timing, carrier phase) is improved. Secondly, as more reliable estimates of the data symbols become available from the decoders 213a-213n, these are used to improve the demodulator performance.

Figure 4A:
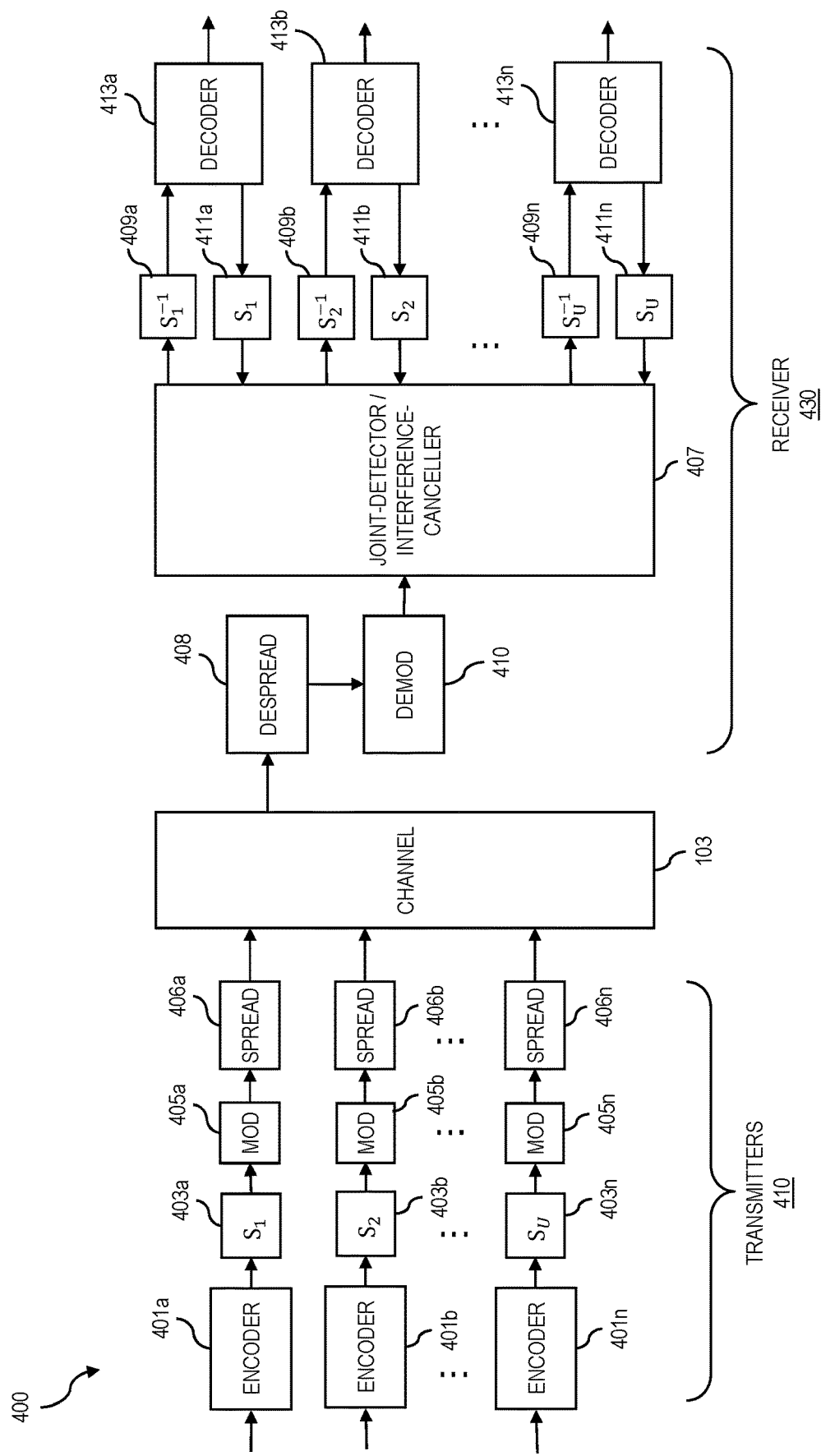
FIG. 4A illustrates a multi-user system which supports multiple transmitters using an SCMA scheme and which also employs spreading according to example embodiments.
Figure 4B:
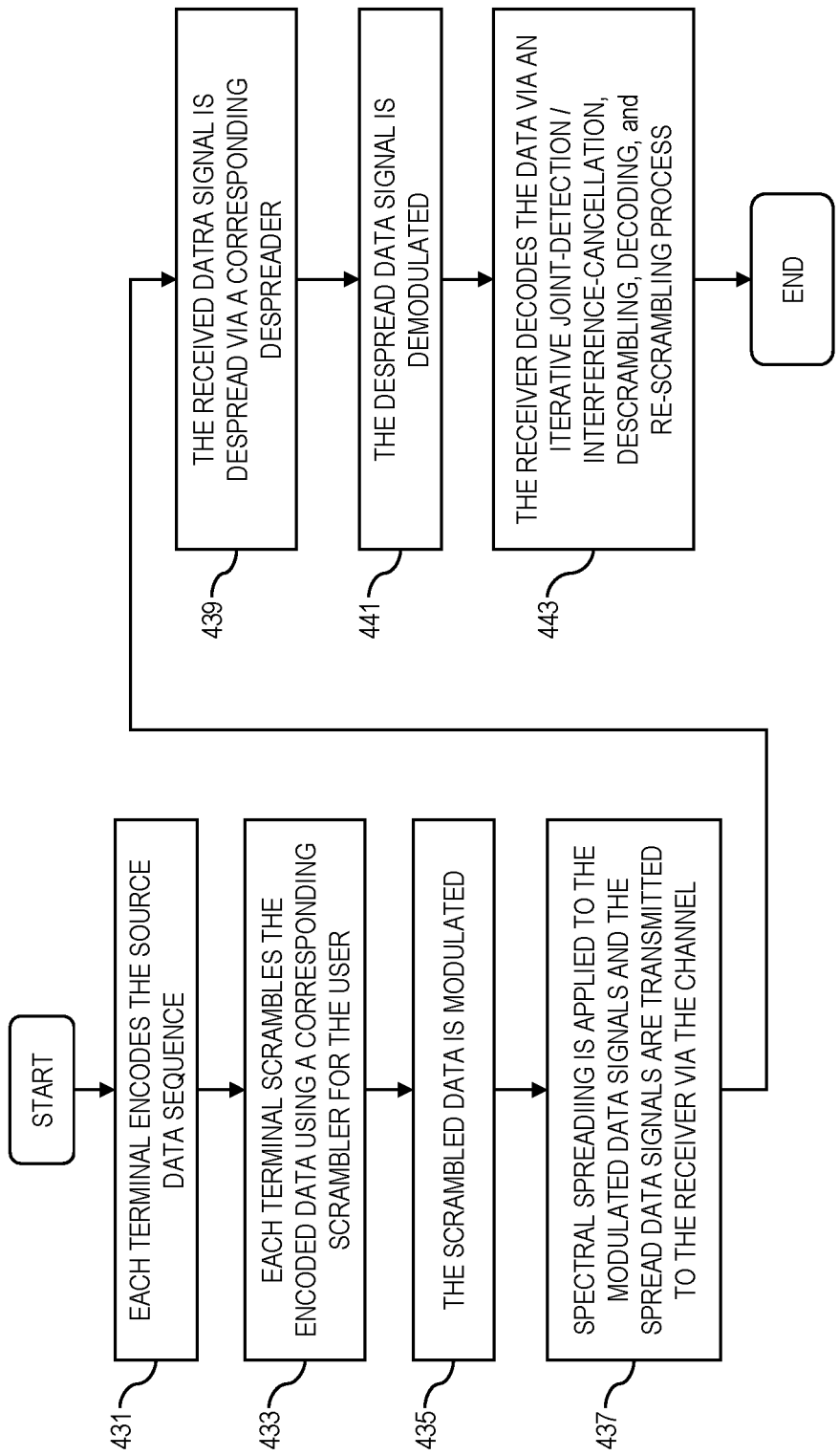
FIG. 4B illustrates a flowchart of an associated scrambling and spreading process employed for the SCMA scheme of FIG. 4A according to example embodiments.

FIG. 4A illustrates a multi-user system which supports multiple transmitters using an SCMA scheme and which also employs spreading, and FIG. 4B illustrates a flowchart of an associated scrambling and spreading process employed for the SCMA scheme of FIG. 4A, according to example embodiments. By Way of example, the multiple-access communications system 400 is similar to the system 200 (depicted in FIG. 2A), except that the system 400 also employs spectral spreading. Accordingly, the system 400 effectively mirrors the system 200 of FIG. 2A, except that the terminals or transmitters 410 include the respective spreaders 406a-406n which spread the modulated signals, and the receivers (of which only one is shown) 430 include the despreader 408. Spectral spreading spreads the modulated signals in the frequency domain, resulting in a signal with a wider bandwidth.

As with the system of FIG. 2A, in the example embodiment of FIG. 4A, each of the encoders 401a-401n utilizes FEC codes (e.g., LDPC code or turbo code) to encode the respective source data sequence (Step 431). The encoded sequences are fed to the respective user-specific scramblers 403a-403n. Each scrambler scrambles the encoded sequence fed to it based on a scrambling signature that is specific to the respective terminal (Step 433), which will be determined by the receiver in order to attribute each received sequence to the respective terminal from which the sequence originated. Alternatively, here also, each terminal may utilize the same scrambler hardware (e.g., a common interleaver design) with a different respective terminal-specific initial vector (also known as "seed"), instead of a different terminal-scrambler design (e.g., interleaver design) being implemented in each respective terminal. Further, using scrambling sequences as signatures is simpler than random interleaver-based signatures. The scrambled sequences are then modulated via the respective modulators 405a-405n (Step 435), the modulated signals are then spread via the spreaders 406a-406n, and the spread signals are transmitted over channel 103 to the receiver (Step 437). The receiver first despreads the received data signal via the despreader 410 (Step 439), and then demodulates the despread signal to generate the individual data signals (Step 441). The receiver then decodes the received sequences via an iterative process, whereby, via each iteration, the receiver determines a better estimate of the original data sequence, until a reliable estimate is reached (Step 443). The information exchanged between decoders 413a-413n and joint-detector/interference-canceller 407 is descrambled/scrambled via the descramblers 409a-409n and scramblers 411a-411n, respectively. Once good estimates of the decoded sequences are produced, they are output from the decoders 413a-413n.

The spreader can match the modulated signal waveforms to a given channel bandwidth via spectral spreading by a spreading factor of F (e.g., F=4, 16, etc.). The spreader, for example, may employ spread spectrum techniques in order to spread, in frequency domain, energy and/or power generated in a particular bandwidth to result a signal with a wider bandwidth. Spectral spreading, for example, can achieve results such as limiting power flux density, providing for a more secure communications link, preventing detection, resistance to interference and/or jamming, etc. The spreader, for example, may employ frequency hopping, direct sequence, or a hybrid of these to spread the modulated signal waveform. However, other spreading techniques such as time-hopping spread spectrum (THSS) and/or chirp spread spectrum (CSS) can be employed.

According to further example embodiments, in the case of LDPC encoding, the LDPC encoder systematically encodes an input block of size $k_{ldpc}$ information bits ($i_0, i_1, \ldots, i_{k_{ldpc}-1}$), to generate a respective codeblock of size $n_{ldpc}$ code bits c, including the $k_{ldpc}$ information bits and $n_{ldpc}-k_{ldpc}$ parity bits: $c=(i_0, i_1, \ldots, i_{k_{ldpc}-1}, p_0, p_1, \ldots, p_{n_{ldpc}-k_{ldpc}-1})$.

According to one such example embodiment, The task of the LDPC encoder is to determine $n_{ldpc}-k_{ldpc}$ parity bits ($p_0, p_1, \ldots, p_{n_{ldpc}-k_{ldpc}-1}$) for every block of $k_{ldpc}$ information bits ($i_0, i_1, \ldots, i_{k_{ldpc}-1}$). The procedure is as follows.

First, initialize the parity bits to zero, $p_0=p_1=\ldots=p_{n_{ldpc}-k_{ldpc}-1}=0$.

Second, for the first information bit $i_0$, accumulate $i_0$ at the parity bit addresses specified in the first row of a respective Parity Bit Accumulator Address Table.

Third, for the next M−1 information bits, $i_m$, (m=1, 2, ..., M−1), accumulate the information bits $i_m$ at parity bit addresses {x+m mod M*q} mod ($n_{ldpc}-k_{ldpc}$), where x denotes the address of the parity bit accumulator corresponding to the first bit $i_0$, and M and q are code dependent constants.

Fourth, for the (M+1)$^{st}$ information bit $i_M$, accumulate $i_M$ at the parity bit addresses specified in the second row of the Parity Bit Accumulator Address Table. Then, in a similar manner accumulate the next M−1 information bits $i_m$, (m=M+1, M+2, ..., 2M−1) at the parity bit addresses {x+m mod M*q} mod ($n_{ldpc}-k_{ldpc}$), where x denotes the address of the parity bit accumulator corresponding to the first bit $i_M$, (the entries of the second row of the respective table).

Fifth, in a similar manner, for every further group of M new information bits, a new row from the respective Parity Bit Accumulator Address Table is used for the respective parity bit accumulator addresses.

Sixth, once all of the information bits are exhausted, the final parity bits are obtained by sequentially performing the following operations, starting with i=1: $p_i=p_i \oplus p_{i-1}$, where i=1, 2, ..., $n_{ldpc}-k_{ldpc}-1$, and then the final content of $p_i$=0, 1, ..., $n_{ldpc}-k_{ldpc}-1$ is equal to the parity bit $p_i$.

With the above NOMA scheme, an arbitrary number of users can use a channel simultaneously, and the users can transmit asynchronously without any coordination among themselves—in other words partial overlap between users are permitted. For example, the number of active users can be assumed based on a Poisson model with a mean arrival rate of users/codeblock time, so the higher the value of A is, the more users arrive on average per codeblock. In this context, the LDPC code can be optimized for different values of $\lambda$. This concept can also be extended to other FEC schemes as well, such as turbo codes. The degree of a node is the number of edges incident on that node. Bit nodes with large degrees collect more information from their adjacent check nodes than bit nodes with small degrees. For regular LDPC codes, if the bit node degree is increased while the check node degree is fixed, then the rate is decreased which results in a more powerful code. Optimizing the degree profile of an LDPC code by varying bit and check node degrees (e.g., varying the column weights and row weights) may result in improved performance of the code. Further, different bit node degrees of LDPC codes significantly contribute to the decoding performance. For example, with check node degrees of either 2 or 3 can greatly simplify the check node arithmetic.

For simplicity, all the information bit nodes are assumed to have the same degree, however, the same concept can be extended to LDPC codes with varying information bit node degrees. FIG. 5A shows a check matrix of an example class of LDPC codes. In FIG. 5A, each entry is an M×M submatrix, where M is an integer, the entry "-" denotes an M×M all zero matrix, the entry "0" denotes an M×M identity matrix, and the entry "D" denotes an M×M special matrix as shown in FIG. 5B. The systematic part of the parity check matrix corresponds to information bits. In the matrix of FIG. 5A, most of the entries are "-" (all zero submatrices), similar to the parity part. There are only a few nonzero entries which are M×M circularly shifted identity matrices. The number of nonzero entries in each column is called the degree of the particular node. So in the example of FIG. 5A, all of the parity bit nodes have degree 2, except for one parity node which has degree 1. The degree of the information bit nodes in the systematic part of the matrix depends on the number of nonzero submatrices.

Figure 6B:
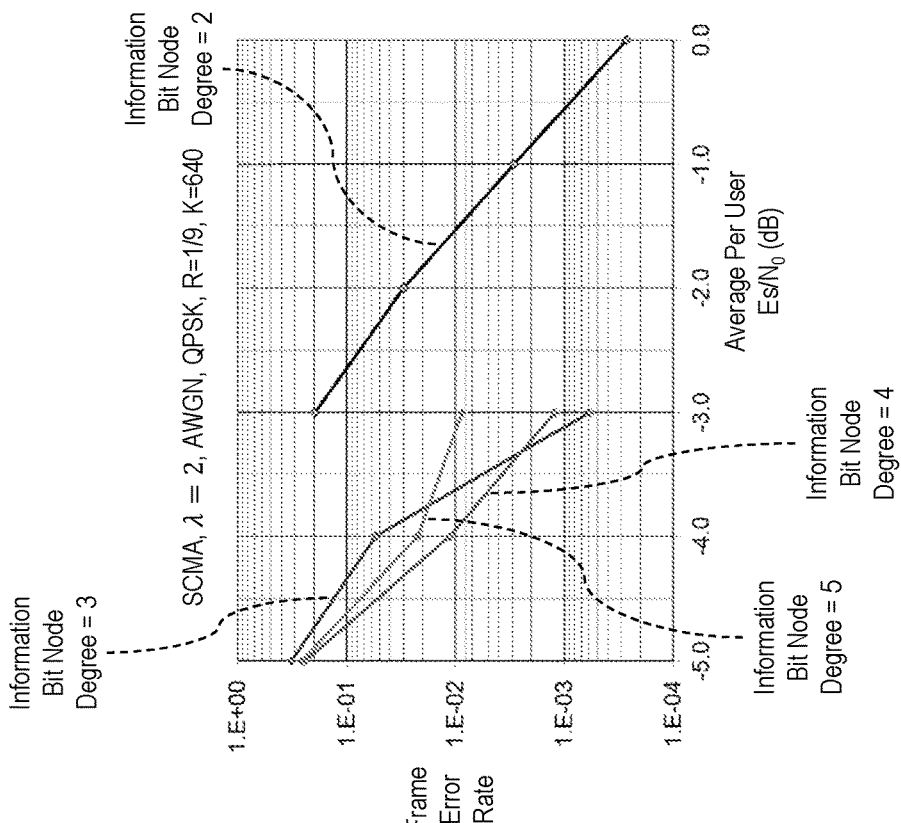
FIG. 6B shows multi-user asynchronous SCMA performance of different rate 1/9 LDPC codes, where K=640 and λ=2, with information bit node degrees of 2, 3, 4 and 5.
Figure 6A:
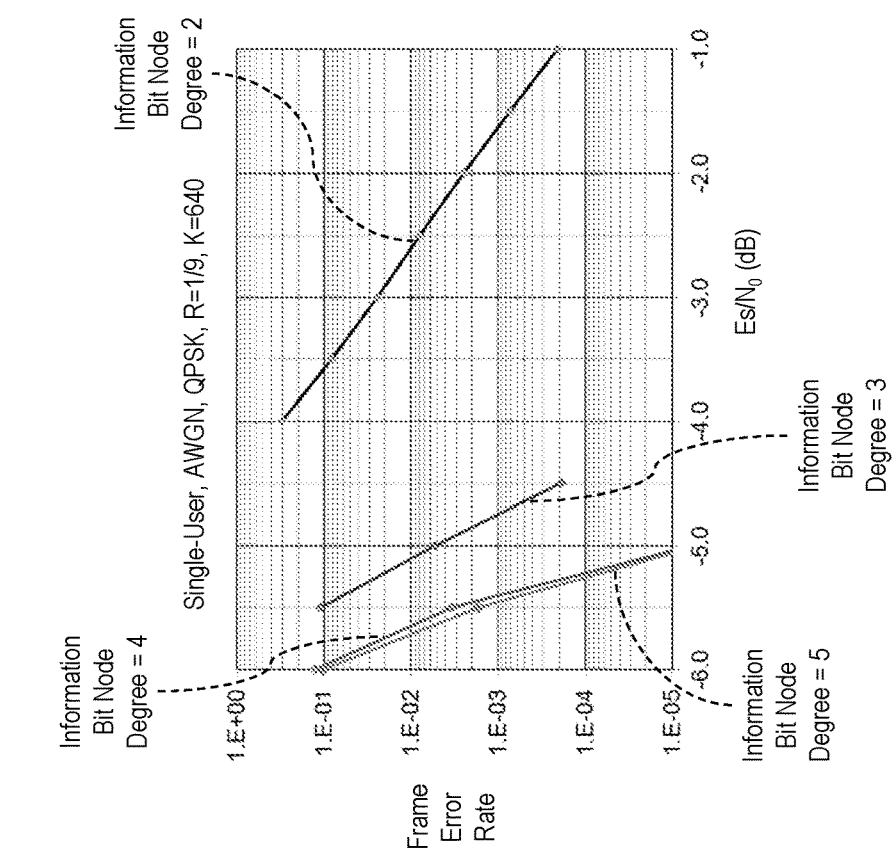
FIG. 6A shows single-user performance of different rate 1/9 LDPC codes of K=640, with information bit node degrees of 2, 3, 4, 5.
Figure 6D:
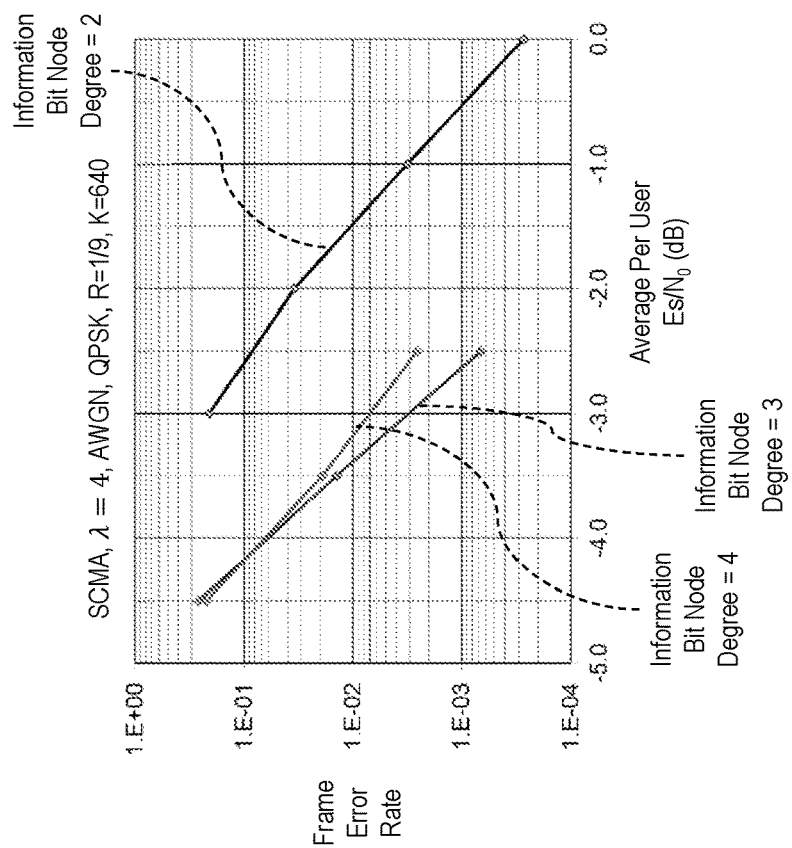
FIG. 6D shows multi-user asynchronous SCMA performance of different rate 1/9 LDPC codes, where K=640 and λ=4, with information bit node degrees of 2, 3 and 4.
Figure 6C:
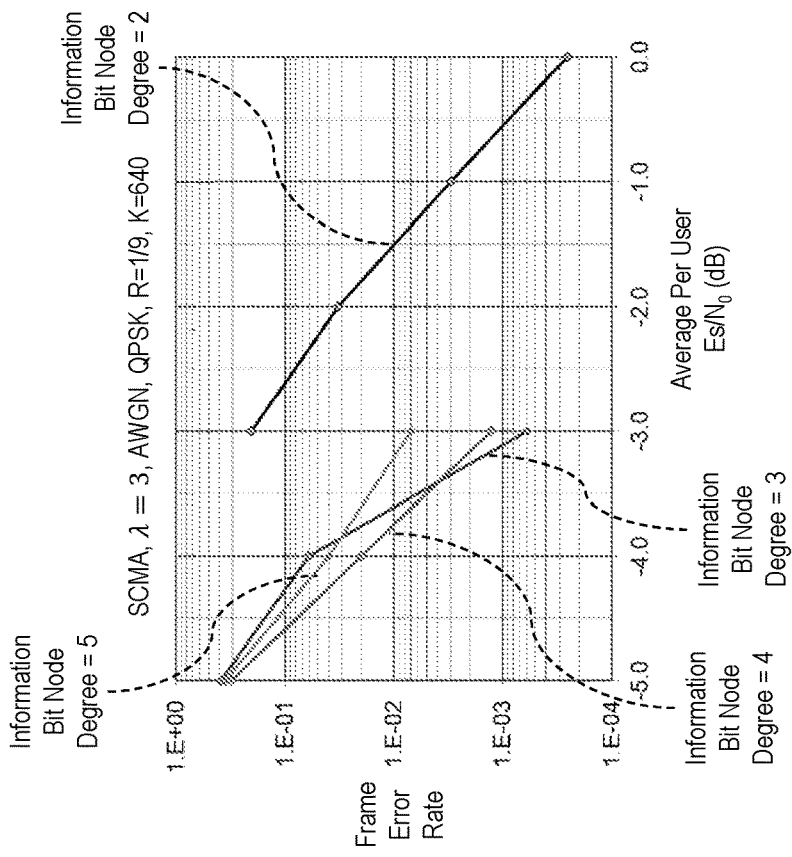
FIG. 6C shows multi-user asynchronous SCMA performance of different rate 1/9 LDPC codes, where K=640 and λ=3, with information bit node degrees of 2, 3, 4 and 5.
Figure 6F:
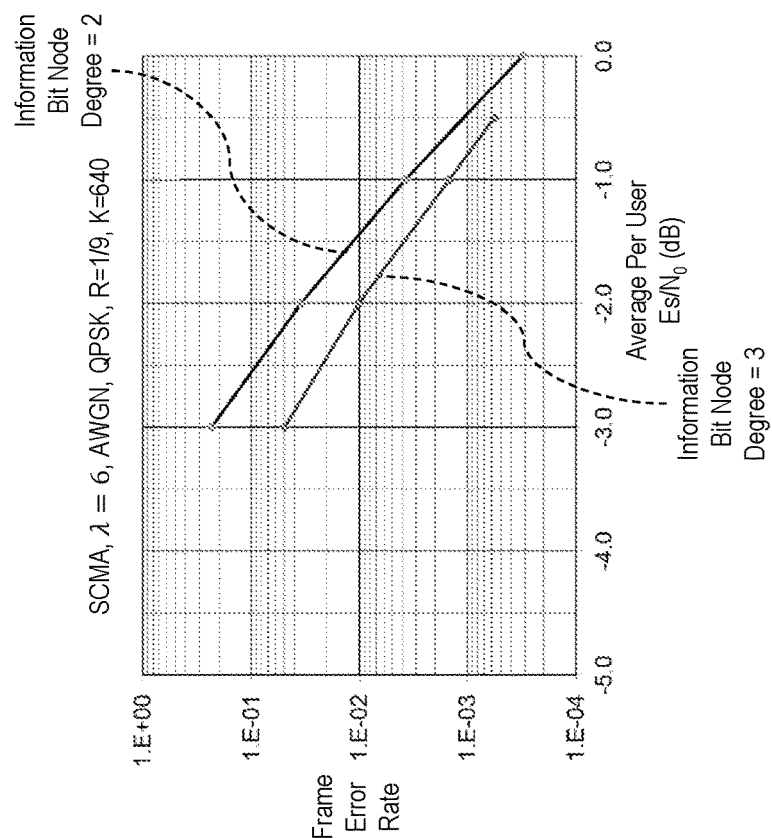
FIG. 6F shows multi-user asynchronous SCMA performance of different rate 1/9 LDPC codes, where K=640 and λ=6, with information bit node degrees of 2 and 3.
Figure 6E:
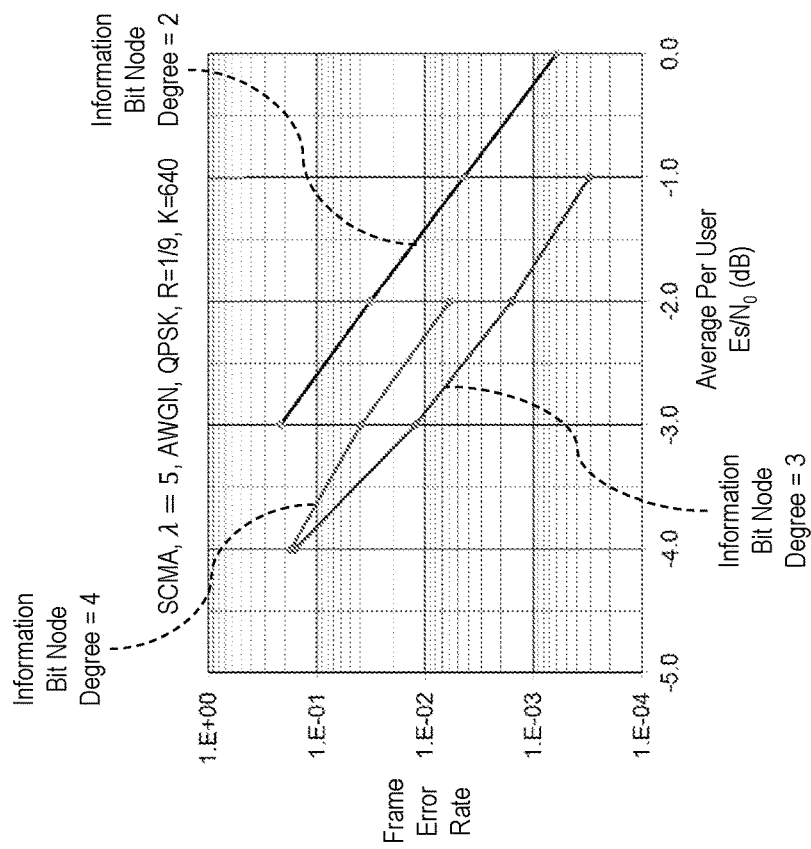
FIG. 6E shows multi-user asynchronous SCMA performance of different rate 1/9 LDPC codes, where K=640 and λ=5, with information bit node degrees of 2, 3 and 4.
Figure 6H:
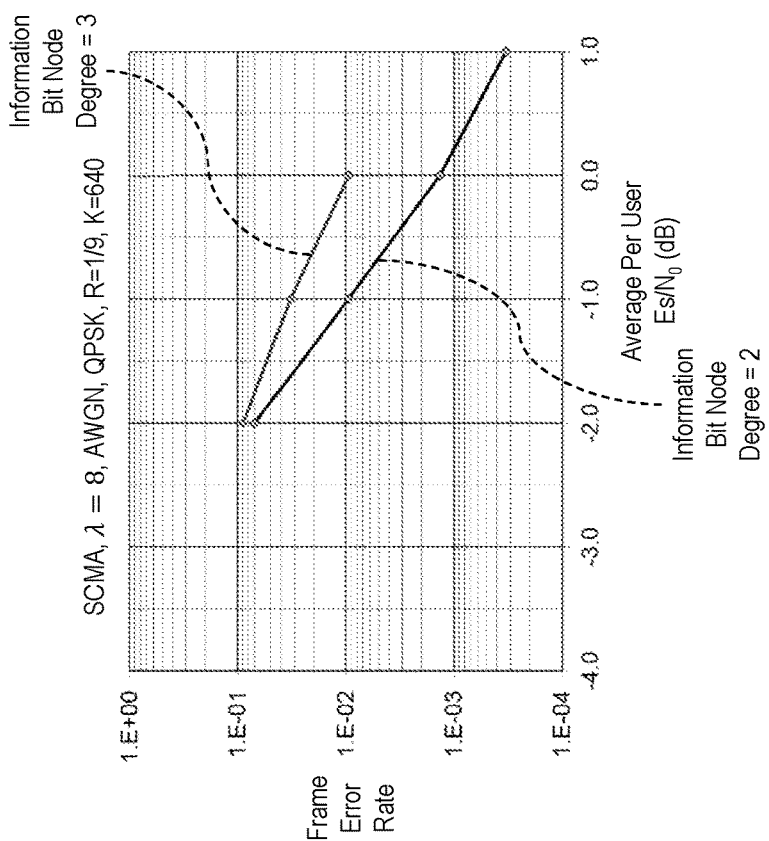
FIG. 6H shows multi-user asynchronous SCMA performance of different rate 1/9 LDPC codes, where K=640 and λ=8, with information bit node degrees of 2 and 3.
Figure 6G:
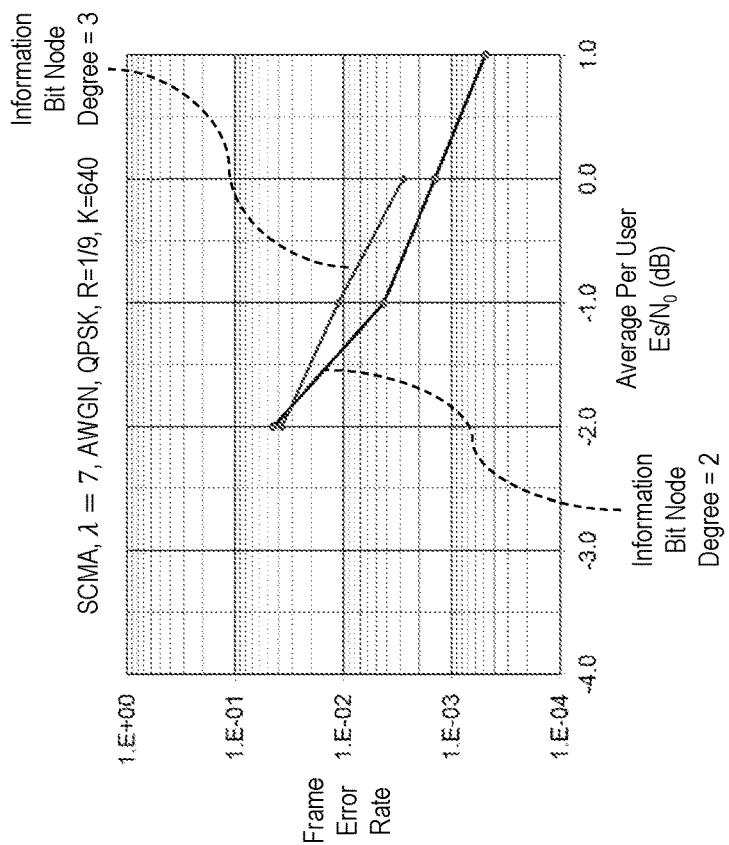
FIG. 6G shows multi-user asynchronous SCMA performance of different rate 1/9 LDPC codes, where K=640 and λ=7, with information bit node degrees of 2 and 3.
Figure 6J:
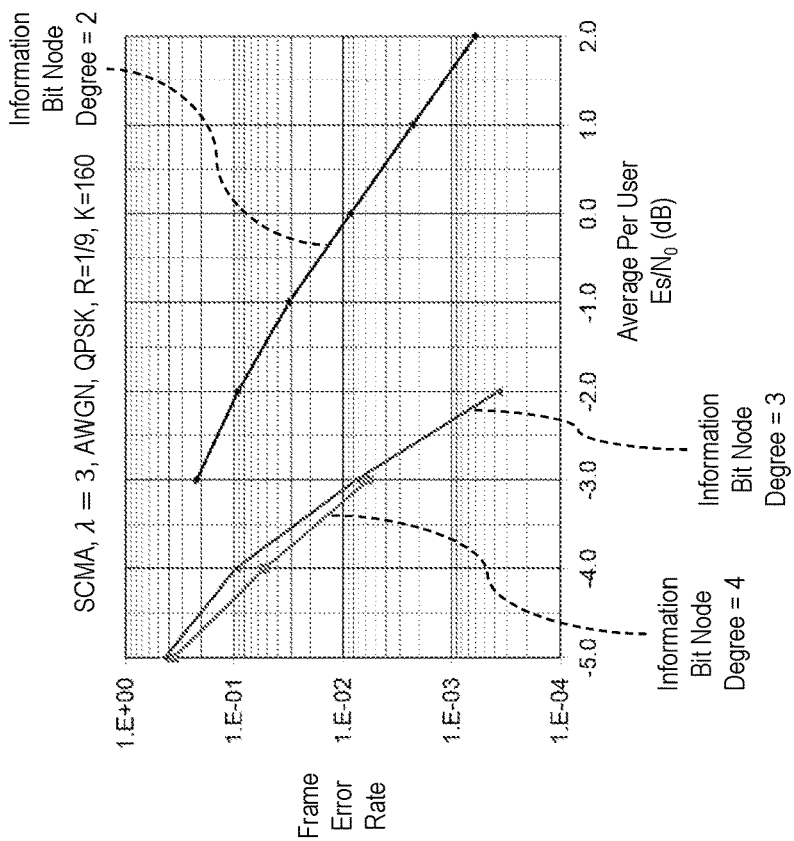
FIG. 6J shows multi-user asynchronous SCMA performance of different rate 1/9 LDPC codes, where K=160 and λ=3, with information bit node degrees of 2, 3 and 4.
Figure 6I:
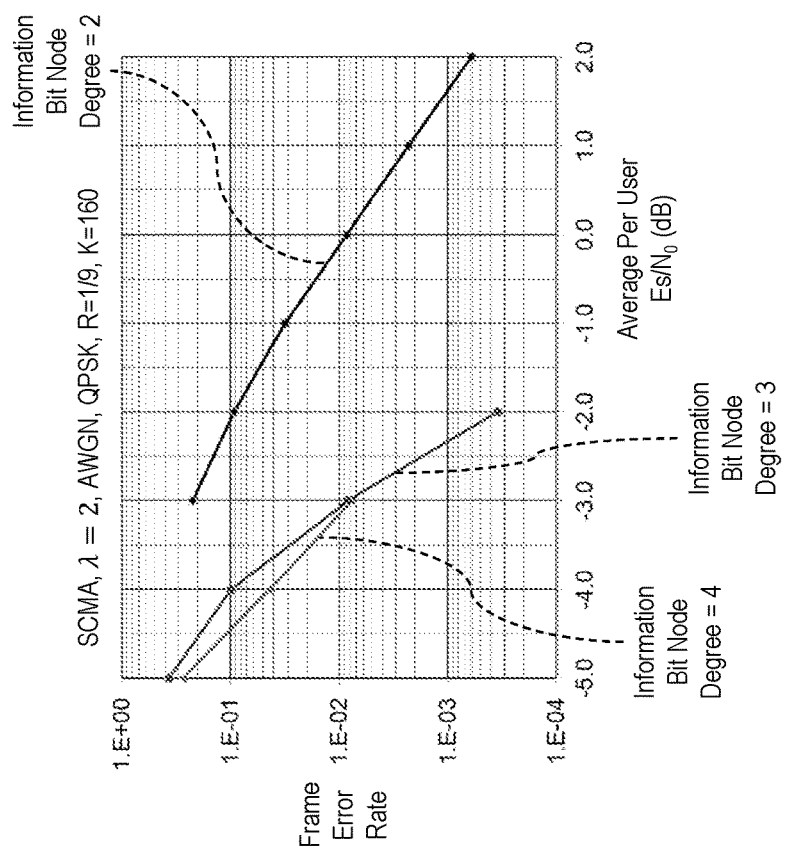
FIG. 6I shows multi-user asynchronous SCMA performance of different rate 1/9 LDPC codes, where K=160 and λ=2, with information bit node degrees of 2, 3 and 4.
Figure 6L:
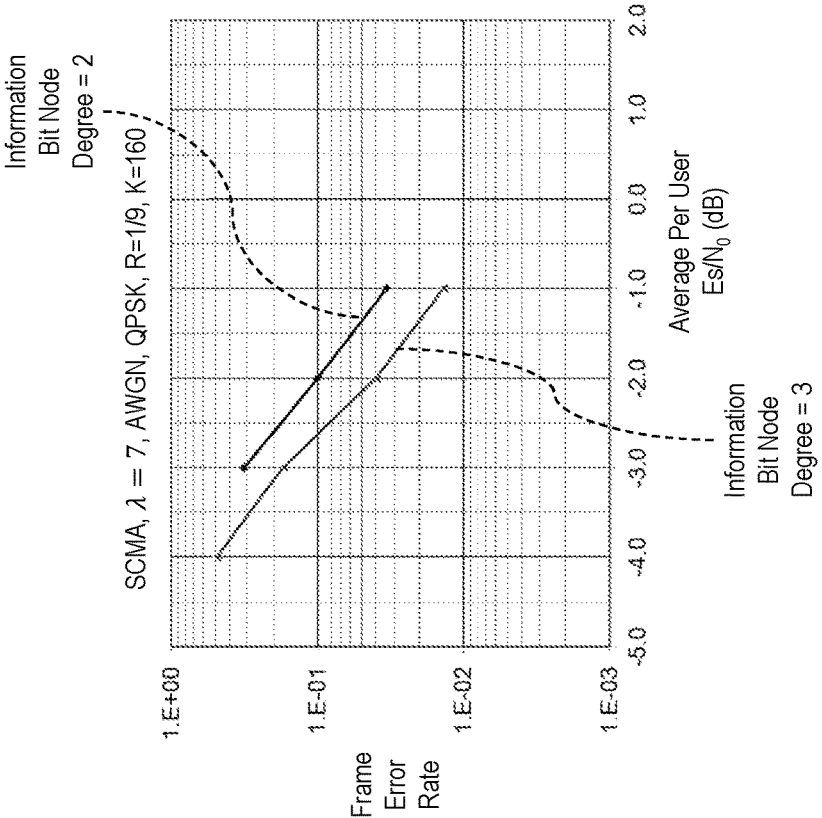
FIG. 6L shows multi-user asynchronous SCMA performance of different rate 1/9 LDPC codes, where K=160 and λ=7, with information bit node degrees of 2 and 3.
Figure 6K:
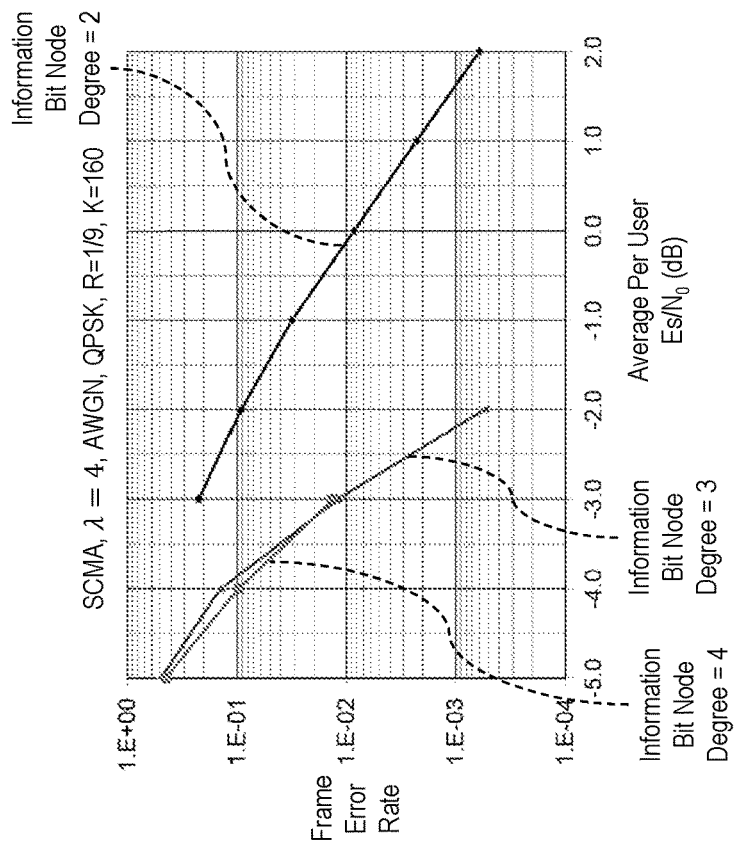
FIG. 6K shows multi-user asynchronous SCMA performance of different rate 1/9 LDPC codes, where K=160 and λ=4, with information bit node degrees of 2, 3 and 4.
Figures 6M, 6N:
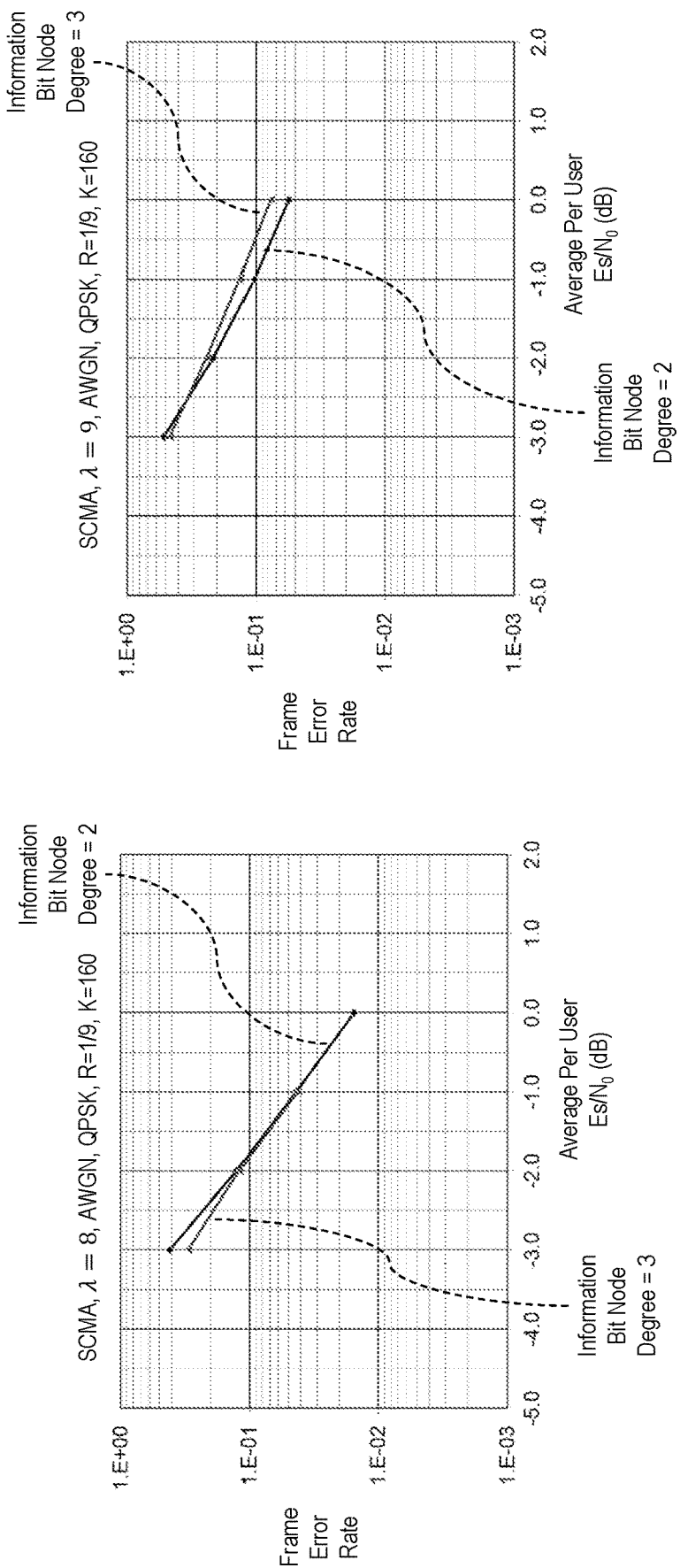
FIG. 6M shows multi-user asynchronous SCMA performance of different rate 1/9 LDPC codes, where K=160 and λ=8, with information bit node degrees of 2 and 3.
FIG. 6N shows multi-user asynchronous SCMA performance of different rate 1/9 LDPC codes, where K=160 and λ=9, with information bit node degrees of 2 and 3.
Figures 6O, 6P:
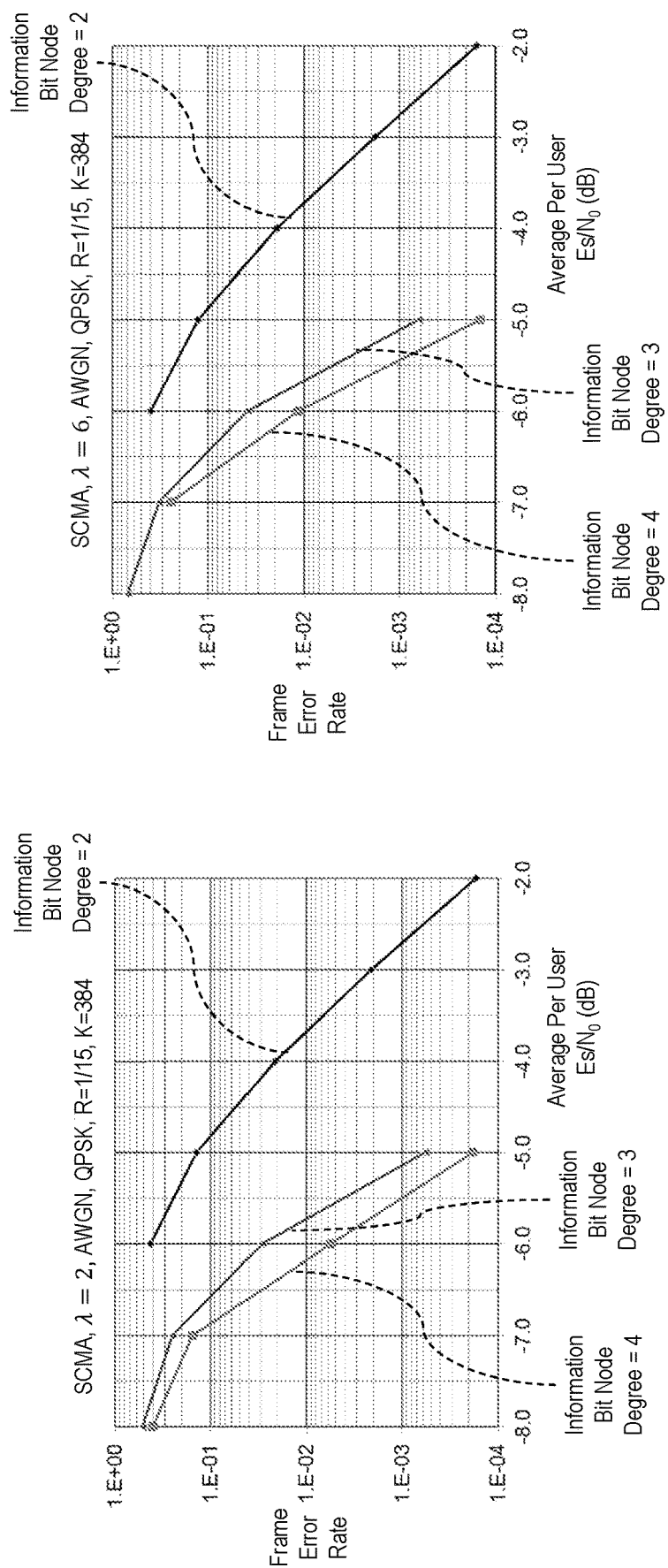
FIG. 6O shows multi-user asynchronous SCMA performance of different rate 1/15 LDPC codes, where K=384 and 2=2, with information bit node degrees of 2, 3 and 4.
FIG. 6P shows multi-user asynchronous SCMA performance of different rate 1/15 LDPC codes, where K=384 and 2=6, with information bit node degrees of 2, 3 and 4.
Figure 6R:
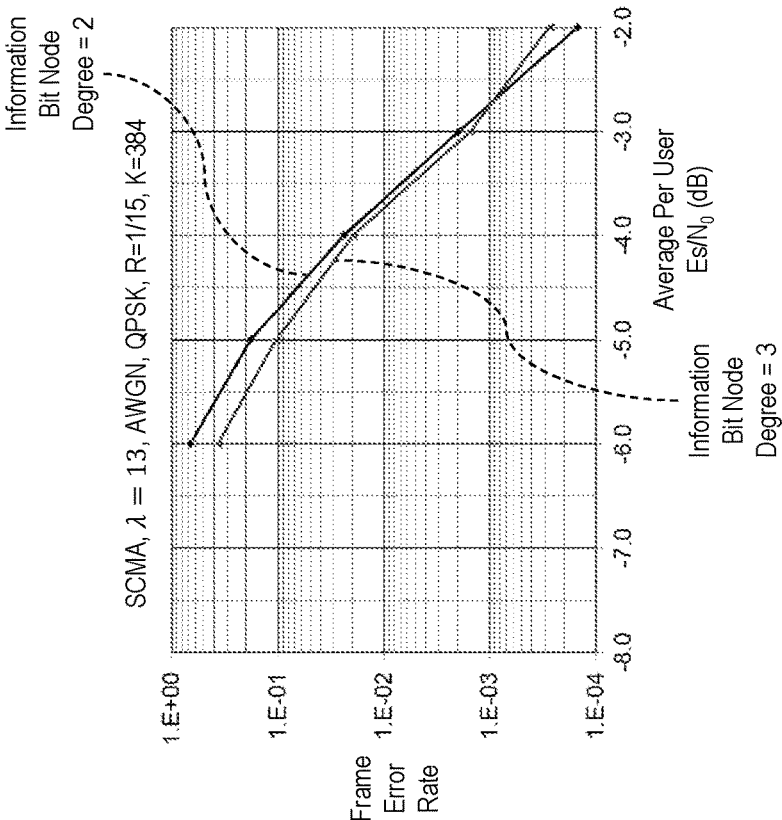
FIG. 6R shows multi-user asynchronous SCMA performance of different rate 1/15 LDPC codes, where K=384 and λ=13, with information bit node degrees of 2 and 3.
Figure 6Q:
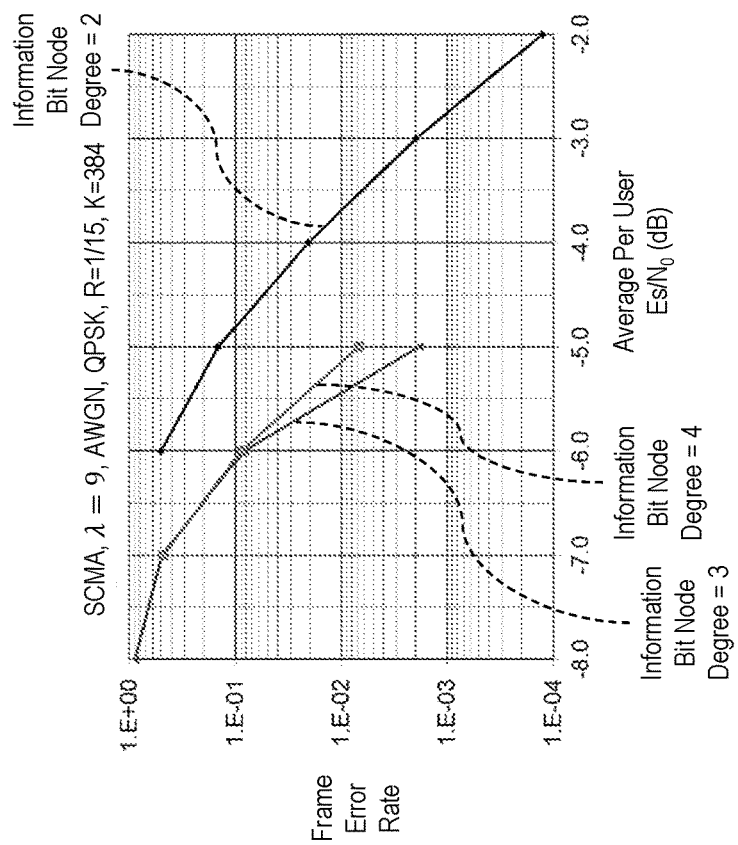
FIG. 6Q shows multi-user asynchronous SCMA performance of different rate 1/15 LDPC codes, where K=384 and 2=9, with information bit node degrees of 2, 3 and 4.
Figure 6T:
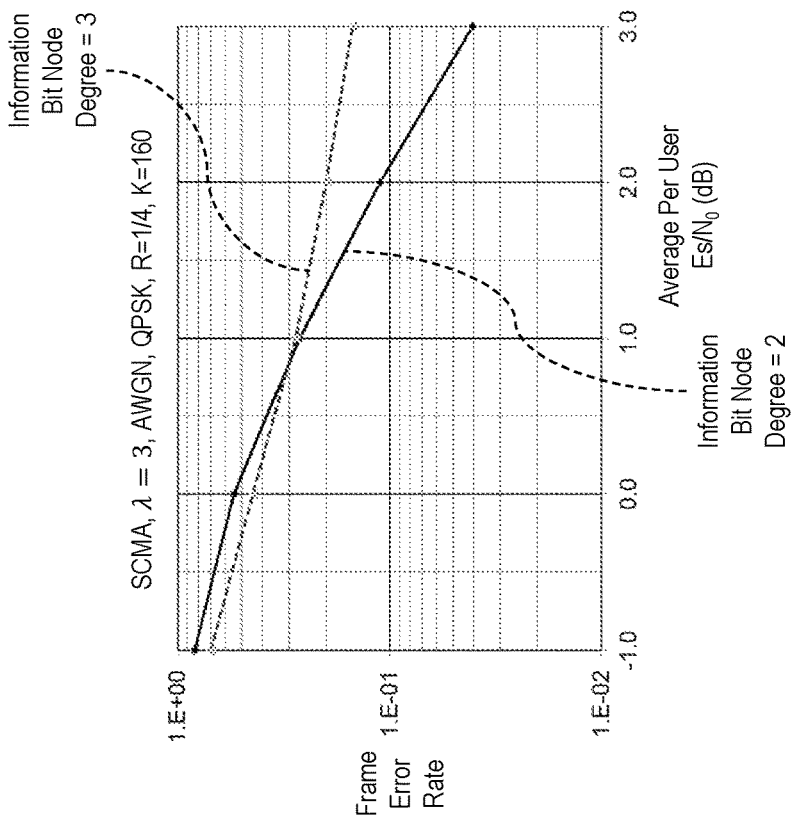
FIG. 6T shows multi-user asynchronous SCMA performance of different rate 1/4 LDPC codes, where K=160 and λ=3, with information bit node degrees of 2 and 3.
Figure 6S:
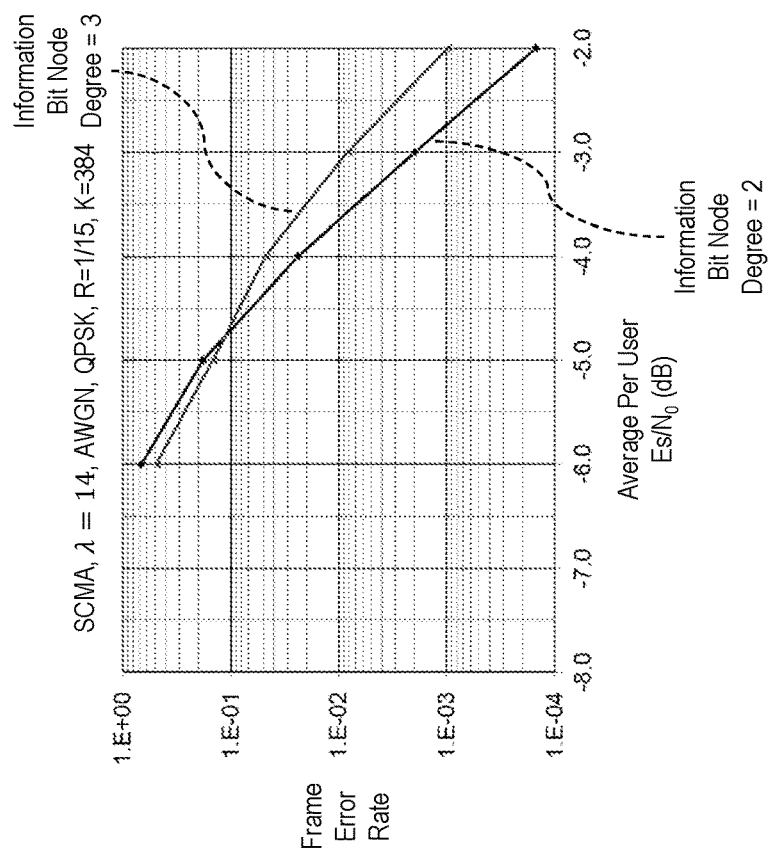
FIG. 6S shows multi-user asynchronous SCMA performance of different rate 1/15 LDPC codes, where K=384 and λ=14, with information bit node degrees of 2 and 3.

According to example embodiments, as illustrated in FIGS. 6B-6T, the optimum information bit node degree changes as the mean poisson arrival rate A changes, and determine the optimum information bit node degree for each $\lambda$. Further, the parity part of the LDPC matrix depicted in FIG. 2 is shown as an example only—other parity parts can be assumed without affecting performance of the optimum information bit node degrees.

With regard to the optimization of the LDPC code for different values of $\lambda$, FIGS. 6A-6T illustrate comparisons between performance of different LDPC codes in a single-user application and performance of different LDPC codes in a multi-user asynchronous SCMA application. FIG. 6A shows single-user performance of different rate 1/9 LDPC codes of K=640, with information bit node degrees of 2, 3, 4, 5.

FIGS. 6B-6H show multi-user asynchronous SCMA performance of different rate 1/9 LDPC codes with information bit node degrees of 2, 3, 4 and 5, for K=640 and $\lambda$=2, 3, 4, 5, 6, 7, 8, respectively.

FIGS. 6I-6N show multi-user asynchronous SCMA performance of different rate 1/9 LDPC codes with information bit node degrees of 2, 3, 4 and 5, for K=160 and $\lambda$=2, 3, 4, 7, 8, 9, respectively.

FIGS. 6O-6S show multi-user asynchronous SCMA performance of different rate 1/15 LDPC codes with information bit node degrees of 2, 3 and 4, where K=384 and $\lambda$=2, 6, 9, 13, 14, respectively.

According to such example embodiments, for a rate 1/9 LDPC code, optimum information bit node degrees for various throughputs (different $\lambda$) are as follows:

| R × $\lambda$ | Optimum Information Bit Node Degree |
| --- | --- |
| R × $\lambda$ < 0.3 | 4 |
| 0.3 < R × $\lambda$ < 0.8 | 3 |
| 0.8 > R × $\lambda$ | 2 |

According to such example embodiments, for a rate 1/15 LDPC code, optimum information bit node degrees for various throughputs (different $\lambda$) are as follows:

| R × $\lambda$ | Optimum Information Bit Node Degree |
| --- | --- |
| R × $\lambda$ < 0.5 | 4 |
| 0.5 < R × $\lambda$ < 0.9 | 3 |
| 0.9 > R × $\lambda$ | 2 |

FIG. 6T shows multi-user asynchronous SCMA performance of different rate 1/4 LDPC codes, where K=160 and $\lambda$=3, with information bit node degrees of 2 and 3. Accordingly, for the case of high total spectral efficiency, with higher code rates such as 1/4, 1/3 and 1/2, bit node degree can be optimized as 2.

In other words, as the average number of simultaneous users (and hence the total spectral efficiency) increases, the optimum average bit node degree decreases for any code rate.

Moreover, the same optimized LDPC codes can be used for other NOMA schemes that rely on iterative multiuser detection/FEC decoding.

Figures 7, 8, 9:
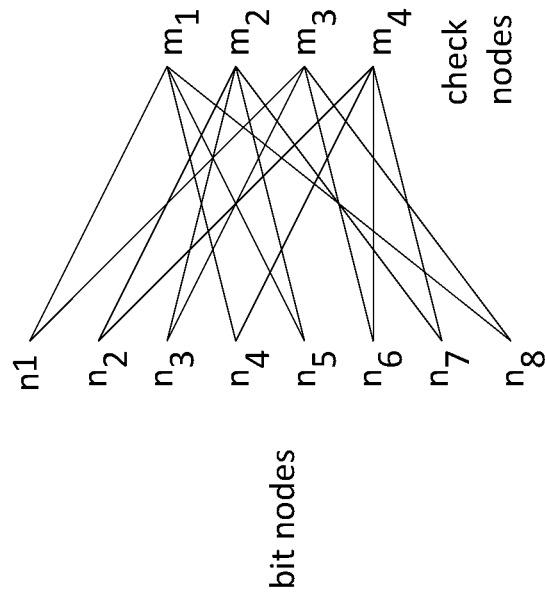
FIG. 7 is a diagram of a sparse LDPC parity check matrix.
FIG. 8 is a diagram of a bipartite graph of an LDPC code of the matrix of FIG. 7.
FIG. 9 is a diagram of a sub-matrix of a sparse LDPC parity check matrix, wherein the sub-matrix contains parity check values restricted to the lower triangular region.

With further regard to the utilization of LDPC codes in a multiple access system, FIG. 7 is a diagram of a sparse LDPC parity check matrix. LDPC codes are long, linear block codes with sparse parity check matrix $H_{(n-k) \times n}$. Typically the block length, n, ranges from thousands to tens of thousands of bits. For example, a parity check matrix for an LDPC code of length n=8 and rate 1/2 is shown in FIG. 7. The same code can be equivalently represented by the bipartite graph, per FIG. 8.

FIG. 8 is a diagram of a bipartite graph of an LDPC code of the matrix of FIG. 7. Parity check equations imply that for each check node, the sum (over GF (Galois Field)(2)) of all adjacent bit nodes is equal to zero. As seen in FIG. 8, bit nodes occupy the left side of the graph and are associated with one or more check nodes, according to a predetermined relationship. For example, corresponding to check node $m_1$, the following expression exists $n_1+n_4+n_5+n_8=0$ with respect to the bit nodes.

Returning to the receiver, the LDPC decoder can be considered a message passing decoder, whereby the decoder aims to find the values of bit nodes. To accomplish this task, bit nodes and check nodes iteratively communicate with each other. The nature of this communications is described below.

From check nodes to bit nodes, each check node provides to an adjacent bit node an estimate ("opinion") regarding the value of that bit node based on the information coming from other adjacent bit nodes. For instance, in the above example if the sum of $n_4$, $n_5$ and $n_8$ "looks like" 0 to $m_1$, then $m_1$ would indicate to $n_1$ that the value of $n_1$ is believed to be 0 (since $n_1+n_4+n_5+n_8=0$); otherwise $m_1$ indicate to $n_1$ that the value of $n_1$ is believed to be 1. Additionally, for soft decision decoding, a reliability measure can be added.

From bit nodes to check nodes, each bit node relays to an adjacent check node an estimate about its own value based on the feedback coming from its other adjacent check nodes. In the above example $n_1$ has only two adjacent check nodes $m_1$ and $m_3$. If the feedback coming from $m_3$ to $n_1$ indicates that the value of $n_1$ is probably 0, then $n_1$ would notify $m_1$ that an estimate of $n_1$'s own value is 0. For the case in which the bit node has more than two adjacent check nodes, the bit node performs a majority vote (soft decision) on the feedback coming from its other adjacent check nodes before reporting that decision to the check node it communicates. The above process is repeated until all bit nodes are considered to be correct (i.e., all parity check equations are satisfied) or until a predetermined maximum number of iterations is reached, whereby a decoding failure is declared.

FIG. 9 is a diagram of a sub-matrix of a sparse LDPC parity check matrix, wherein the sub-matrix contains parity check values restricted to the lower triangular region. The encoder can employ a simple encoding technique by restricting the values of the lower triangular area of the parity check matrix. The restriction imposed on the parity check matrix may be of the form:

$$H_{(n-k) \times n} = [A_{(n-k) \times k} B_{(n-k) \times (n-k)}],$$

where B is lower triangular.

Any information block $i=(i_0, i_1, \ldots, i_{k-1})$ is encoded to a codeword $c=(i_0, i_1, \ldots, i_{k-1}, p_0, p_1, \ldots p_{n-k-1})$ using $Hc^T=0$, and recursively solving for parity bits; for example, $$a_{00}i_0+a_{01}i_1+\ldots+a_{0,k-1}i_{k-1}+p_0=0 \Rightarrow \text{Solve } p_0,$$

$$a_{10}i_0+a_{11}i_1+\ldots+a_{1,k-1}i_{k-1}+b_{10}p_0+p_1=0 \Rightarrow \text{Solve } p_1$$

and similarly for $p_2, p_3, \ldots, p_{n-k-1}$.

Figure 10:
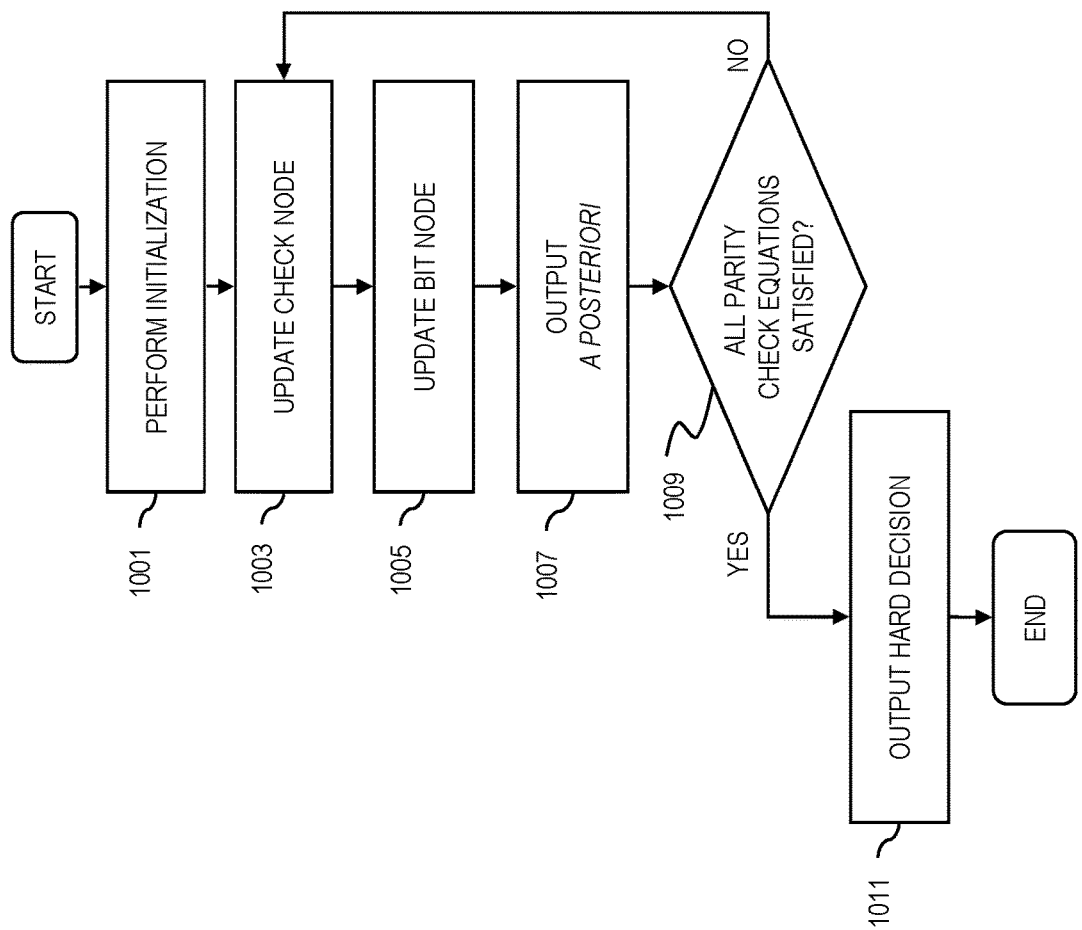
FIG. 10 is a flow chart of the operation of the LDPC decoder.
Figure 11A:
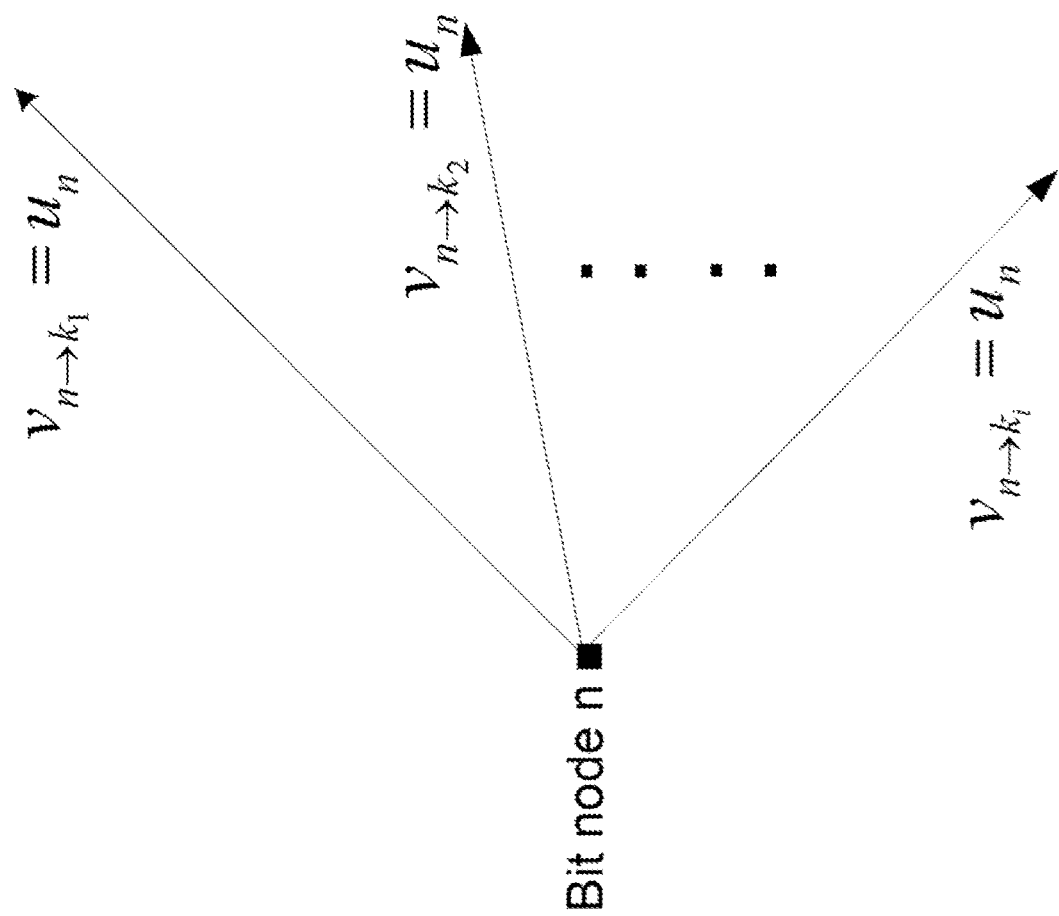

FIG. 10 is a flow chart of the operation of the LDPC decoder. The process of FIG. 10 is discussed with respect to FIGS. 11A-11C, which are diagrams of interactions between the check nodes and the bit nodes in the LDPC decoding process. At step 1001, an initialization is performed. The initialization of step 1001 is carried out before the first LDPC decoder iteration only. The initialization, as further illustrated in FIG. 11A, is achieved by assigning a-priori log-likelihood information of every transmitted bit to all of the outgoing edges of the corresponding bit node, as follows.

$$v_{n \to k_i} = u_n, n=0,1,\ldots,N-1, i=1,2,\ldots,\text{deg(bit node } n)$$

Here, $v_{n \to k_i}$ denotes the message that goes from bit node n to its adjacent check node $k_i$, $u_n$ denotes the a-priori log-likelihood for the bit n, and N is the codeword size.

At step 1003 a check node, for example, check node k, is updated, whereby the input v yields the output w. As illustrated in FIG. 11B, incoming messages to the check node k from its $d_c$ adjacent bit nodes are denoted by $v_{n_1 \to k}$, $v_{n_2 \to k}, \ldots, v_{n_{d_c} \to k}$. The goal is to compute the outgoing messages from the check node k back to $d_c$ adjacent bit nodes. These messages are denoted by $w_{k \to n_1}$, $w_{k \to n_2}, \ldots, w_{k \to n_{d_c}}$, as is computed as follows.

$$w_{k \to n_i} = g(v_{n_1 \to k}, v_{n_2 \to k}, \ldots, v_{n_{i-1} \to k}, v_{n_{i+1} \to k}, \ldots, v_{n_{d_c} \to k})$$

where, $$g(a,b)=\text{sign}(a) \times \text{sign}(b) \times \{\min(|a|,|b|)\}+\text{LUT}_g(a,b)$$

$$\text{LUT}_g(a,b) = \log(1+e^{-|a+b|}) - \log(1+e^{-|a-b|})$$

In practice, $\text{LUT}_g(\bullet)$ function is implemented using a small look up table. Also it can be shown that the $g(\bullet)$ function with multiple inputs can be recursively computed, i.e., $$g(v_{n_1 \to k}, v_{n_2 \to k}, \ldots, v_{n_{i-1} \to k}, v_{n_{i+1} \to k}, \ldots, v_{n_{d_c} \to k}) =$$

$$g(g_{n_1 \to k}, v_{n_2 \to k}, \ldots, v_{n_{i-1} \to k}, v_{n_{i+1} \to k}, \ldots, v_{n_{d_c} \to k}),$$
$$v_{n_{d_c} \to k})$$

In examples where the check node degree is either 2 or 3, when the check node degree is two, $w_{k \to n_1} = v_{n_2 \to k}$ and $w_{k \to n_2} = v_{n_1 \to k}$, and when check node degree is three, $w_{k \to n_2} = g(v_{n_1 \to k}, v_{n_3 \to k})$ and $w_{k \to n_3} = g(v_{n_1 \to k}, v_{n_2 \to k})$.

Figure 11C:
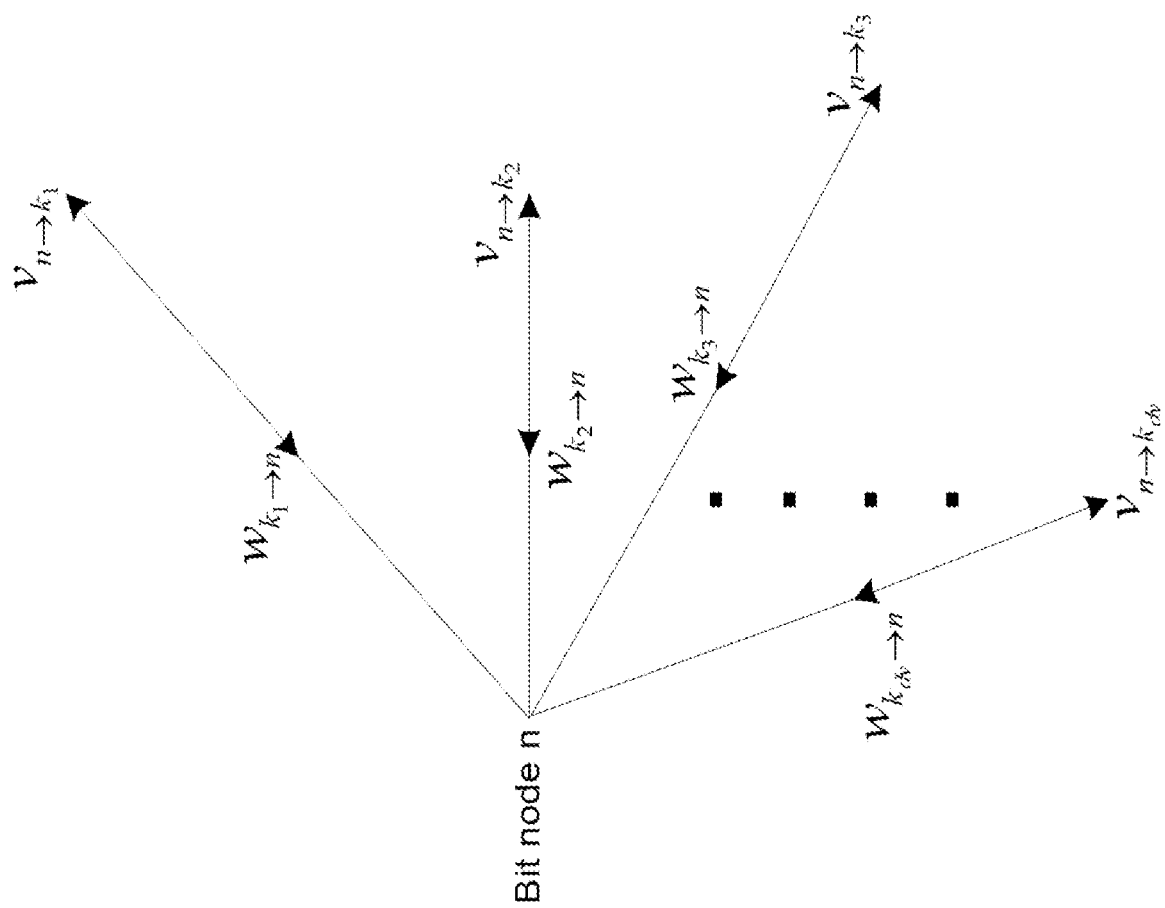

At steps 1005 and 1007, a bit node, for example, bit node n, is updated and the a-posteriori probability information is output. The incoming messages to the bit node n from its $d_v$ adjacent check nodes can be denoted by $w_{k_1 \to n}$, $w_{k_2 \to n}, \ldots, w_{k_{d_v} \to n}$, as illustrated in FIG. 11C. The goal is to compute the outgoing messages from the bit node n back to $d_v$ adjacent check nodes. The outgoing messages can be denoted by $v_{n \to k_1}, v_{n \to k_2}, \ldots, v_{n \to k_{d_v}}$ and can be computed as $$v_{n \to k_i} = u_n + \sum_{j \neq i} w_{k_j \to n}.$$

Also, a-posteriori probability information is output as $$a_{n_i} = u_n + \sum_j w_{k_j \to n}$$

$$n = 0, 1, 2 \ldots, N-1.$$

At step 1009 it is determined whether all parity check equations are satisfied. A hard decision can be made based on the sign of $a_{n_i}$. If the parity check equations are not satisfied, steps 1003-1007 are repeated; otherwise the hard decision is output. The hard decision can be expressed as $$\hat{c}_n = \begin{cases} 0, & a_n \geq 0 \\ 1, & a_n < 0 \end{cases}$$

Stop if $H\hat{c}^T = 0$

In the case that the parity check equations are not satisfied and steps 1003-1007 are repeated, if no convergence is achieved after pre-determined number of iterations, the current output is given out and a decoding failure can be declared.

Two general approaches exist to realize the interconnections between check nodes and bit nodes: (1) a fully parallel approach, and (2) a partially parallel approach. In fully parallel architecture, all of the nodes and their interconnections are physically implemented. The advantage of this architecture is speed. The fully parallel architecture, however, may involve greater complexity in realizing all of the nodes and their connections. Therefore with fully parallel architecture, a smaller block size may be required to reduce the complexity. In that case, for the same clock frequency, a proportional reduction in throughput and some degradation in FER versus Es/No performance may result.

The second approach to implementing LDPC codes is to physically realize only a subset of the total number of the nodes and use only these limited number of "physical" nodes to process all of the "functional" nodes of the code. Even though the LDPC decoder operations can be made extremely simple and can be performed in parallel, the further challenge in the design is how the communications is established between "randomly" distributed bit nodes and check nodes. The decoder may address this problem by accessing memory in a structured way, as to realize a seemingly random code. This approach is explained with respect to FIGS. 12A and 12B.

Figure 12B:
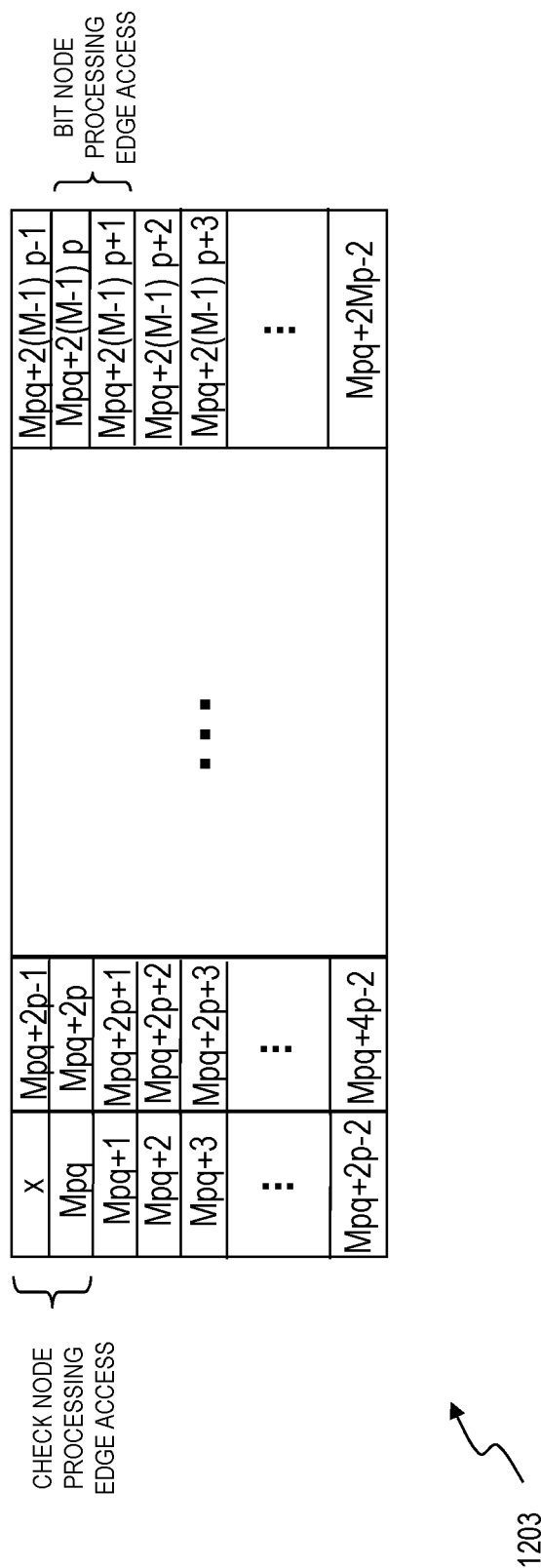

FIGS. 12A and 12B are diagrams of the top edge and bottom edge, respectively, of memory organized to support structured access as to realize randomness in LDPC coding. Structured access can be achieved without compromising the performance of a truly random code by focusing on the generation of the parity check matrix. In general, a parity check matrix can be specified by the connections of the check nodes with the bit nodes. For example, the bit nodes can be divided into groups of a fixed size, which for illustrative purposes is M. In one example, M is number of parallel computation engines. Additionally, assuming the check nodes connected to the first bit node of degree 3, for instance, are numbered as a, b and c, then the check nodes connected to the second bit node are numbered as a+p, b+p and c+p, the check nodes connected to the third bit node are numbered as a+2p, b+2p and c+2p etc.; where p=(number of check nodes)/M. For the next group of M bit nodes, the check nodes connected to the first bit node are different from a, b, c so that with a suitable choice of p, all the check nodes have the same degree. A random search can be performed over the free constants such that the resulting LDPC code is cycle-4 and cycle-6 free. Further, because of the structural characteristics of the parity check matrix, the edge information can be stored to permit concurrent access to a group of relevant edge values during decoding.

In other words, the approach of the present invention facilitates memory access during check node and bit node processing. The values of the edges in the bipartite graph can be stored in a storage medium, such as random access memory (RAM). It is noted that for a truly random LDPC code during check node and bit node processing, the values of the edges would need to be accessed one by one in a random fashion. However, such a conventional access scheme would be too slow for a high data rate application. The RAM of FIGS. 12A and 12B are organized in a manner, whereby a large group of relevant edges can be fetched in one clock cycle; accordingly, these values are placed "together" in memory, according to a predetermined scheme or arrangement. It is observed that, in actuality, even with a truly random code, for a group of check nodes (and respectively bit nodes), the relevant edges can be placed next to one another in RAM, but then the relevant edges adjacent to a group of bit nodes (respectively check nodes) will be randomly scattered in RAM. Therefore, the "togetherness," under the present invention, stems from the design of the parity check matrices themselves. That is, the check matrix design ensures that the relevant edges for a group of bit nodes and check nodes are simultaneously placed together in RAM.

As illustrated in FIGS. 12A and 12B, each box contains the value of an edge, which is multiple bits (e.g., 8 bits). Edge RAM may be conceptually divided into two parts, top edge RAM 1201 (FIG. 12A) and bottom edge RAM 1203 (FIG. 12B). Bottom edge RAM 1203 contains the edges between parity bit nodes of degree 2, for instance, (or 1 for one single bit node) and check nodes. Top edge RAM 1201 contains the edges between information bit nodes and check nodes. For every check node, therefore, 2 adjacent edges are stored in the bottom RAM 1203, and the rest of the edges are stored in the top edge RAM 1201. A group of M bit nodes and M check nodes is processed at a time. For M check node processing, $q=d_c-2$ consecutive rows from top edge RAM 1201 and 2 consecutive rows from bottom edge RAM 1203 is accessed, which the value of $d_c$ can depend on the code rate. For bit node processing, if the group of M bit nodes are parity bit nodes, their edges are located in 2 consecutive rows of the bottom edge RAM 1203. If the bit nodes are information bit nodes with degree $d_v$, their edges are located in some dv rows of the top edge RAM 1201. The address of these dv rows can be stored in non-volatile memory, such as Read-Only Memory (ROM). The edges in one of the rows correspond to the first edges of M bit nodes, the edges in another row correspond to the second edges of M bit nodes, etc. Moreover for each row, the column index of the edge that belongs to the first bit node in the group of M can also be stored in ROM. The edges that correspond to the second, third, etc. bit nodes follow the starting column index in a "wrapped around" fashion. For example, if the $j^{th}$ edge in the row belongs to the first bit node, then the $(j+1)^{st}$ edge belongs to the second bit node, $(j+2)^{nd}$ edge belongs to the third bit node, . . . , and $(j-1)^{st}$ edge belongs to the $M^{th}$ bit node. With the organization shown in FIGS. 12A and 12B, speed of memory access is greatly enhanced during LDPC coding.

Figure 13B:
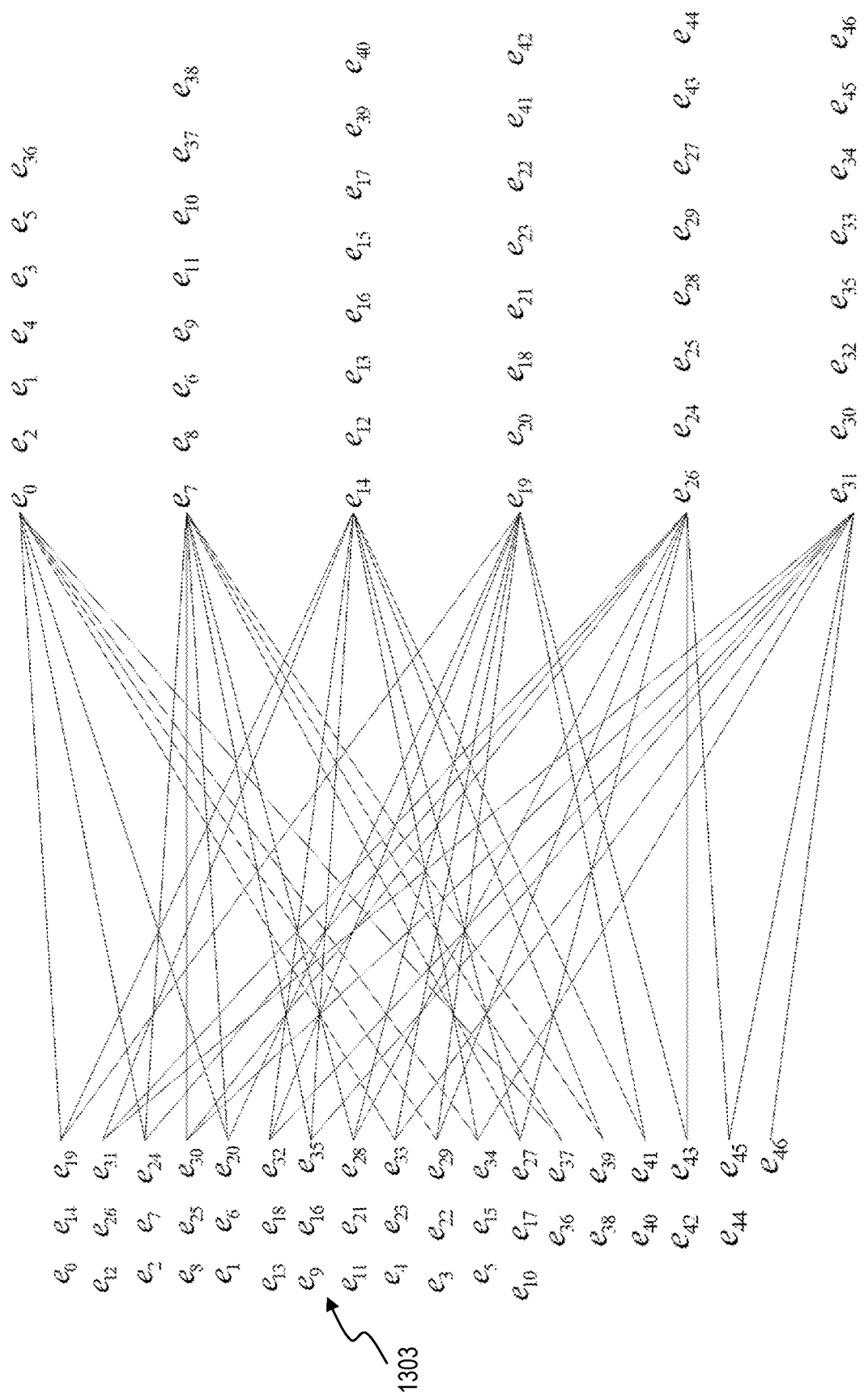

FIGS. 13A-13D are diagrams of an example parity check matrix, bipartite graph, top edge RAM and bottom edge RAM, respectively, to support structured access as to realize randomness in LDPC coding. FIG. 13A illustrates a sparse parity check matrix 1301 of an LDPC code, and FIG. 13B illustrates the corresponding bipartite graph 1303 of the LDPC code of the matrix 1301. In this example, all but one check node has degree $d_c=8$ and M=3 nodes are processed in parallel. The arrangement of top edge RAM 1305 is illustrated in FIG. 13C and the arrangement of bottom edge RAM 1307 is illustrated in FIG. 13D.

In this example, check nodes are partitioned into groups of M=3 {0, 2, 4}, {1, 3, 5}. There is no need to store the groups since the computation engines do not care which nodes are processed. For the first group, $d_c-2=6$ adjacent edges are $e_0\ e_1\ e_2\ e_3\ e_4\ e_5\ e_{12}\ e_{13}\ e_{14}\ e_{15}\ e_{16}\ e_{17}\ e_{24}\ e_{25}\ e_{26}\ e_{27}\ e_{28}\ e_{29}$. All the above edges are stored in the first 6 rows of top edge RAM 1305. Therefore, it is only needed that those 6 rows be fetched. Moreover, in each row the $j^{th}$ element belongs to the $j^{th}$ check node in the group. The remaining adjacent edges are $e_{36}\ e_{39}\ e_{40}\ e_{43}\ e_{44}$. These remaining edges are stored in the first two rows of bottom edge RAM 1307. Similar to top edge RAM 1305 case, in each row, the $j^{th}$ element belongs to the $j^{th}$ check node in the group. Similar structure exists for the other group of check nodes. Therefore, as far as check node processing is concerned, there is no need for any ROM storage. Simply, consecutive rows of edge RAM's are accessed and within each row, it is known exactly where to find the edge for a particular check node in the group.

Also, bit nodes of degree $d_v>2$ are partitioned into groups of M=3 {0, 1, 2}, {3, 4, 5}, {6, 7, 8}, {9, 10, 11}. Bit nodes in the first group have degree 3 and their adjacent edges are $e_0\ e_{14}\ e_{19}\ e_{12}\ e_{26}\ e_{31}\ e_2\ e_7\ e_{24}$. All these edges can appear in top edge RAM 1305, namely rows indexed 0, 2 and 7. These row indices can be stored in ROM. Row 0 carries $e_0\ e_{12}\ e_{24}$, row 2 carries $e_2\ e_{14}\ e_{26}$, and row 7 carries $e_7\ e_{19}\ e_{31}$. Similar to the check node case, each row carries one adjacent edge per bit node. On the other hand they might not be in perfect order as in the case of check nodes. In other words the $j^{th}$ element in each row does not necessarily belong to the $j^{th}$ node. However, as it was explained before, if the $j^{th}$ element belongs to the first bit node, then $(j+1)^{st}$ element belongs to the second bit, $(j+2)^{nd}$ element belongs to the third bit node, etc., and finally $(j-1)^{st}$ element belongs to the $M^{th}$ bit node (in a barrel shifted manner). Therefore, all needed to be stored in ROM is the index j of each row that belongs to the first bit node in the group. In this example, it can be noticed that for row indexed 0, $e_0$ belongs to the first bit node (j=0); for row indexed 2, $e_{14}$ belongs to the first bit node (j=1) and for row indexed 7, $e_{19}$ belongs to the first bit node (j=1). Therefore, the first part of our ROM table reads 0/0 2/1 7/1. Going through the other groups in a similar manner, following ROM table can be obtained:

| | | |
|---|---|---|
| 0/0 | 2/1 | 7/1 |
| 1/2 | 6/2 | 8/0 |
| 4/1 | 9/0 | 11/2 |
| 3/0 | 5/2 | 10/1 |

Following with this example, bit nodes of degree $d_v=2$ can be divided into the groups $\{12, 14, 16\}, \{13, 15, 17\}$. It can be verified that adjacent edges of each group occur in two consecutive rows of bottom edge RAM 1307 and moreover, in each row the $j^{th}$ element belongs to the $j^{th}$ bit node in the group (except for the last group where $j^{th}$ element of the bottom row and $((j+1) \mod M)$ element of the top row belongs to the same bit node). Therefore, for this case too, there is no need for ROM storage.

FIGS. 14A-14D are diagrams of a further example parity check matrix, bipartite graph, top edge RAM and bottom edge RAM, respectively, to support structured access as to realize randomness in LDPC coding.

Figure 14A:
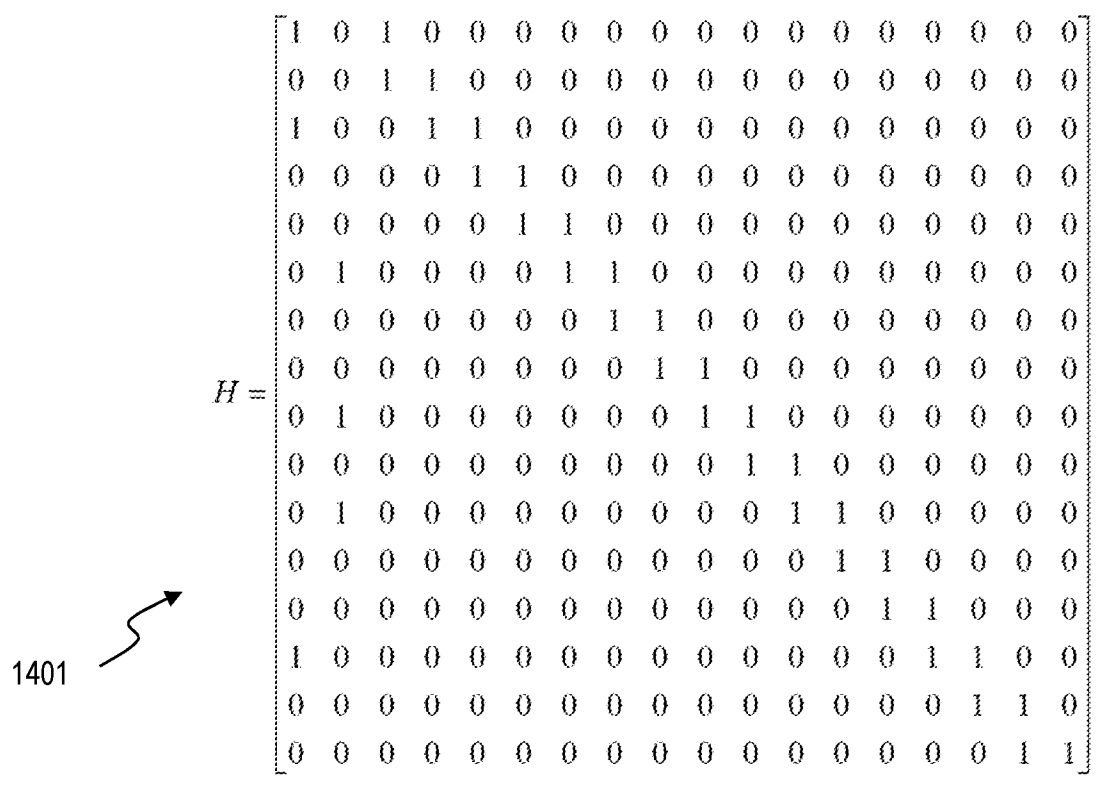

FIG. 14A illustrates a sparse parity check matrix 1401 of an LDPC code, and FIG. 14B illustrates the corresponding bipartite graph 1403 of the LDPC code of the matrix 1401. In this example, for the $n^{th}$ check node, the degree is 3, if n mod 8=0, 2 or 5, otherwise the degree is 2 (exception: degree is 2 for n=0) and M=2 nodes are processed in parallel. The arrangement of top edge RAM 1405 is illustrated in FIG. 14C and the arrangement of bottom edge RAM 1407 is illustrated in FIG. 14D.

In this example, check nodes are partitioned into groups of M=2, $\{0, 8\}, \{1, 9\}, \{2, 10\}, \{3, 11\}, \{4, 12\}, \{5, 13\}, \{6, 14\}, \{7, 15\}$. There is no need to store the groups since the computation engines do not care which nodes are processed. Therefore, check nodes 0 and 8 are processed together, check nodes 1 and 9 are processed together, etc. Groups $\{0, 8\}, \{2, 10\}, \{5, 13\}$ have one more edge in top edge RAM 1405. For the first group of $\{0, 8\}$, those adjacent edges are $e_0$ and $e_3$ and they are stored in the first row of top edge RAM 1405. Therefore, only that one row needs to be fetched. Moreover, in each row, the $j^{th}$ element belongs to the $j^{th}$ check node in the group. The remaining adjacent edges are $e_6\ e_{21}\ e_{22}$, which are stored in the first two rows of bottom edge RAM 1407. Similar to top edge RAM 1405 case, in each row the $j^{th}$ element belongs to the $j^{th}$ check node in the group. For the next group of check nodes $\{1, 9\}$, all the adjacent edges are in the bottom edge RAM 1407, namely third and fourth row. Similar structure exists for the other group of check nodes. Therefore, as far as check node processing is concerned, there is no need for any ROM storage. Simply, consecutive rows of edge RAM's are accessed and within each row, it is known exactly where to find the edge for a particular check node in the group.

Bit nodes of degree $d_v>2$ are partitioned into groups of M=2. In this example, there is only one group $\{0, 1\}$. They have degree 3 and their adjacent edges are $e_0\ e_1\ e_5\ e_2\ e_3\ e_4$. These edges can appear in top edge RAM 1405, namely rows indexed 0, 1 and 2. These row indices are stored in ROM. Row 0 carries $e_0\ e_3$, row 1 carries $e_1\ e_4$, row 2 carries $e_2\ e_5$. Similar to the check node case, each row carries one adjacent edge per bit node. On the other hand they are not in perfect order as in the case of check nodes. In other words the $j^{th}$ element in each row does not necessarily belong to the $j^{th}$ node. However, as noted above, if the $j^{th}$ element belongs to the first bit node, then $(j+1)^{st}$ element belongs to the second bit, $(j+2)^{nd}$ element belongs to the third bit node etc. and finally $(j-1)^{st}$ element belongs to the $M^{th}$ bit node (in a barrel shifted manner). Therefore, all needed to be stored in ROM is the index j of each row that belongs to the first bit node in the group. In the above example, for row indexed 0, $e_0$ belongs to the first bit node (j=0); for row indexed 1, $e_1$ belongs to the first bit node (j=0), and for row indexed 2, $e_5$ belongs to the first bit node (j=1). Therefore the ROM table reads 0/0 1/0 2/1.

Bit nodes of degree $d_v=2$ can be divided into the following groups: $\{2, 10\}, \{3, 11\}, \{4, 12\}, \{5, 13\}, \{6, 14\}, \{7, 15\}, \{8, 16\}\{9, 17\}$. It can be verified that adjacent edges of each group occur in two consecutive rows of bottom edge RAM 1407 and moreover, in each row the $j^{th}$ element belongs to the $j^{th}$ bit node in the group (except for the last group where $j^{th}$ element of the bottom row and $((j+1) \mod M)$ element of the top row belong to the same bit node). Therefore for this case too, there is no need for ROM storage.

Figure 15:
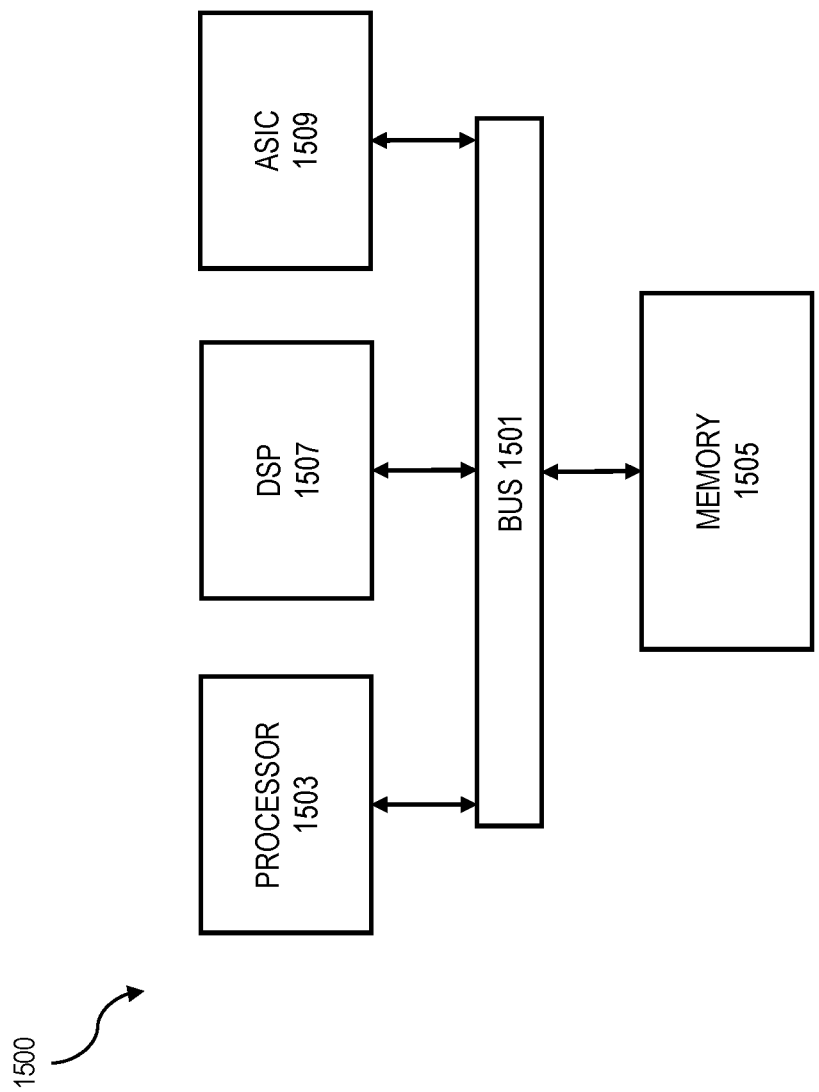
FIG. 15 illustrates a block diagram of a chip set, one or more of which may be configured to respectively implement different aspects of example embodiments of the present invention.

FIG. 15 illustrates a block diagram of a chip set, one or more of which may be configured to respectively implement different aspects of example embodiments of the present invention. The chip set 1500 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set includes a communications mechanism such as a bus 1501 for passing information among the components of the chip set. A processor 1503 has connectivity to the bus to execute instructions/programs and process information stored in, for example, a memory 1505. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 1507, and/or one or more application-specific integrated circuits (ASIC) 1509. A DSP typically is configured to process real-time signals (e.g., sound or video) in real time independently of the processor. Similarly, an ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor and accompanying components have connectivity to the memory via the bus. The memory may include both dynamic memory (e.g., RAM) and static memory (e.g., ROM) for storing executable instructions that, when executed by the processor and/or the DSP and/or the ASIC, perform the process of example embodiments as described herein. The memory may also store the data associated with or generated by the execution of the process.

Further, the functionality of the example embodiments of the present invention may be provided by the chip set, in response to the processor executing an arrangement of program instructions contained in memory. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
encoding, by an encoder of a first data communications terminal, a first data stream using a forward error correction (FEC) code to generate a first encoded data stream;
scrambling, by a scrambler of the first data communications terminal, the first encoded data stream based on a first scrambling signature assigned to the first data communications terminal;
modulating, by a modulator of the first data communications terminal, the scrambled first encoded data stream to generate a first modulated data signal for transmission over a wireless data communications channel;
encoding, by an encoder of a second data communications terminal, a second data stream using the FEC code to generate a second encoded data stream;
scrambling, by a scrambler of the second data communications terminal, the second encoded data stream based on a second scrambling signature assigned to the second data communications terminal;
modulating, by a modulator of the second data communications terminal, the scrambled second encoded data stream to generate a second modulated data signal for transmission over the wireless data communications channel; and
wherein the first scrambling signature and the second scrambling signature respectively assigned to the first data communications terminal and the second data communications terminal distinguish the first encoded data stream from the second encoded data stream as respectively originating from the first data communications terminal and the second data communications terminal, for a multiple access scheme where the first encoded data stream and the second encoded data stream are configured to simultaneously share the wireless data communications channel, and
wherein the FEC code is a low density parity check (LDPC) code configured with a bit node degree of two or three.

2. The method according to claim 1, wherein the FEC code is of a rate of 1/14, 1/12, 1/10, 1/8, 1/6, 1/4, 1/3 or 1/2.

3. The method according to claim 1, further comprising:
applying, by the first data communications terminal, a spectral spreading to the first modulated data signal; and
applying, by the second data communications terminal, the spectral spreading to the second modulated data signal.

4. The method according to claim 1, further comprising:
receiving, by a receiving data communications terminal, a transmission signal via which the first and second modulated data signals were transmitted over the wireless data communications channel; and
decoding, by the receiving data communications terminal, the transmission signal to reproduce the first and second data streams.

5. A data communications terminal comprising:
an encoder configured to encode a data stream of the data communications terminal using a forward error correction (FEC) code to generate an encoded data stream;
a scrambler configured to scramble the encoded data stream based on a scrambling signature assigned to the data communications terminal; and
a modulator configured to modulate the scrambled encoded data stream to generate a modulated data signal for transmission over a wireless data communications channel; and
wherein the scrambling signature is configured to distinguish the encoded data stream from a further encoded data stream of a further data communications terminal, and to distinguish the encoded data stream as originating from the data communications terminal, for a multiple access scheme where the encoded data stream is configured to simultaneously share the wireless data communications channel with the further encoded data stream, and
wherein the FEC code is a low density parity check (LDPC) code configured with a bit node degree of two or three.

6. The data communications terminal according to claim 5, wherein the FEC code is of a rate of 1/14, 1/12, 1/10, 1/8, 1/6, 1/4, 1/3 or 1/2.

7. The data communications terminal according to claim 5, further comprising:
   a signal spreader configured to apply a spectral spreading to the first modulated data signal.

8. A data communications system comprising:
   a first data communications terminal comprising an encoder configured to encode a first data stream of the first data communications terminal using a forward error correction (FEC) code to generate a first encoded data stream, a scrambler configured to scramble the first encoded data stream based on a first scrambling signature assigned to the first data communications terminal, and a modulator configured to modulate the scrambled first encoded data stream to generate a first modulated data signal for transmission over a wireless data communications channel; and
   a second data communications terminal comprising an encoder configured to encode a second data stream of the second data communications terminal using the FEC code to generate a second encoded data stream, a scrambler configured to scramble the second encoded data stream based on a second scrambling signature assigned to the second data communications terminal, and a modulator configured to modulate the scrambled second encoded data stream to generate a second modulated data signal for transmission over the wireless data communications channel; and
   wherein the first scrambling signature and the second scrambling signature respectively assigned to the first data communications terminal and the second data communications terminal distinguish the first encoded data stream from the second encoded data stream as respectively originating from the first data communications terminal and the second data communications terminal, for a multiple access scheme where the first encoded data stream and the second encoded data stream are configured to simultaneously share the wireless data communications channel, and
   wherein the FEC code is a low density parity check (LDPC) code configured with a bit node degree of two or three.

9. The data communications system according to claim 8, wherein the FEC code is of a rate of 1/14, 1/12, 1/10, 1/8, 1/6, 1/4, 1/3 or 1/2.

10. The data communications system according to claim 8, wherein:
    the first data communications terminal further comprises a signal spreader configured to apply a spectral spreading to the first modulated data signal; and
    the second data communications terminal further comprises a signal spreader configured to apply the spectral spreading to the second modulated data signal.

11. The data communications system according to claim 8, further comprising:
    a third data communications terminal comprising a receiver configured to receive a transmission signal via which the first and second modulated data signals were transmitted over the wireless data communications channel, and a decoder configured to decode the transmission signal to reproduce the first and second data streams.

* * * * *